United States Patent
Miyako et al.

(10) Patent No.: US 10,965,228 B2
(45) Date of Patent: Mar. 30, 2021

(54) MOTOR MODULE, ROTATION ANGLE DETECTOR, AND METHOD FOR DETECTING FAILURE OF ROTATION ANGLE DETECTOR

(71) Applicant: ALPS ALPINE CO., LTD., Tokyo (JP)

(72) Inventors: Ikuyasu Miyako, Miyagi (JP); Tsutomu Abe, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 36 days.

(21) Appl. No.: 16/674,105

(22) Filed: Nov. 5, 2019

(65) Prior Publication Data
US 2020/0076336 A1    Mar. 5, 2020

Related U.S. Application Data

(63) Continuation-in-part of application No. PCT/JP2018/017513, filed on May 2, 2018.

(30) Foreign Application Priority Data

May 9, 2017  (JP) .............................. JP2017-093294

(51) Int. Cl.
H02P 6/00    (2016.01)
(52) U.S. Cl.
CPC .................................... *H02P 6/007* (2013.01)
(58) Field of Classification Search
USPC ......................................................... 318/560
See application file for complete search history.

(56) References Cited

U.S. PATENT DOCUMENTS 4,876,637 A * 10/1989 Mose ................... H02M 5/4505
363/37
4,931,715 A *  6/1990 Lee ........................ H02P 25/024
318/709

(Continued)

FOREIGN PATENT DOCUMENTS

JP       H04-156222         5/1992
JP       H06-311773        11/1994

(Continued)

OTHER PUBLICATIONS

International Search Report dated Jul. 17, 2018 in PCT/JP2018/017513 filed on May 2, 2018.

*Primary Examiner* — Bentsu Ro
(74) *Attorney, Agent, or Firm* — IPUSA, PLLC

(57) ABSTRACT

A rotation angle detector includes a rotational angular velocity calculator that calculates a rotational angular velocity of a motor based on an inter-terminal voltage of the motor detected by a voltage detector and a current flowing through the motor and detected by a current detector; a ripple detector that detects a ripple component included in the current; and a failure detector that detects a failure of any one of the voltage detector, the current detector, and the ripple detector based on outputs from the detectors. The failure detector determines that the failure has occurred when a state, where the outputs from two of the voltage detector, the current detector, and the ripple detector indicate normal rotation and the output from the remaining one of the voltage detector, the current detector, and the ripple detector does not indicate normal rotation, continues for a predetermined period of time.

12 Claims, 14 Drawing Sheets

(56) References Cited

U.S. PATENT DOCUMENTS

| | | | |
|---|---|---|---|
| 7,157,874 B2* | 1/2007 | Nomura | B62D 5/0487 |
| | | | 318/432 |
| 2001/0052756 A1* | 12/2001 | Noro | B62D 5/049 |
| | | | 318/432 |
| 2006/0125439 A1* | 6/2006 | Ajima | B60L 50/16 |
| | | | 318/716 |
| 2013/0033216 A1* | 2/2013 | Kariatsumari | H02P 6/00 |
| | | | 318/504 |
| 2015/0188478 A1* | 7/2015 | Saeki | H02P 5/74 |
| | | | 318/812 |

FOREIGN PATENT DOCUMENTS

| | | |
|---|---|---|
| JP | H11-089263 | 3/1999 |
| JP | 2014-007807 | 1/2014 |

* cited by examiner

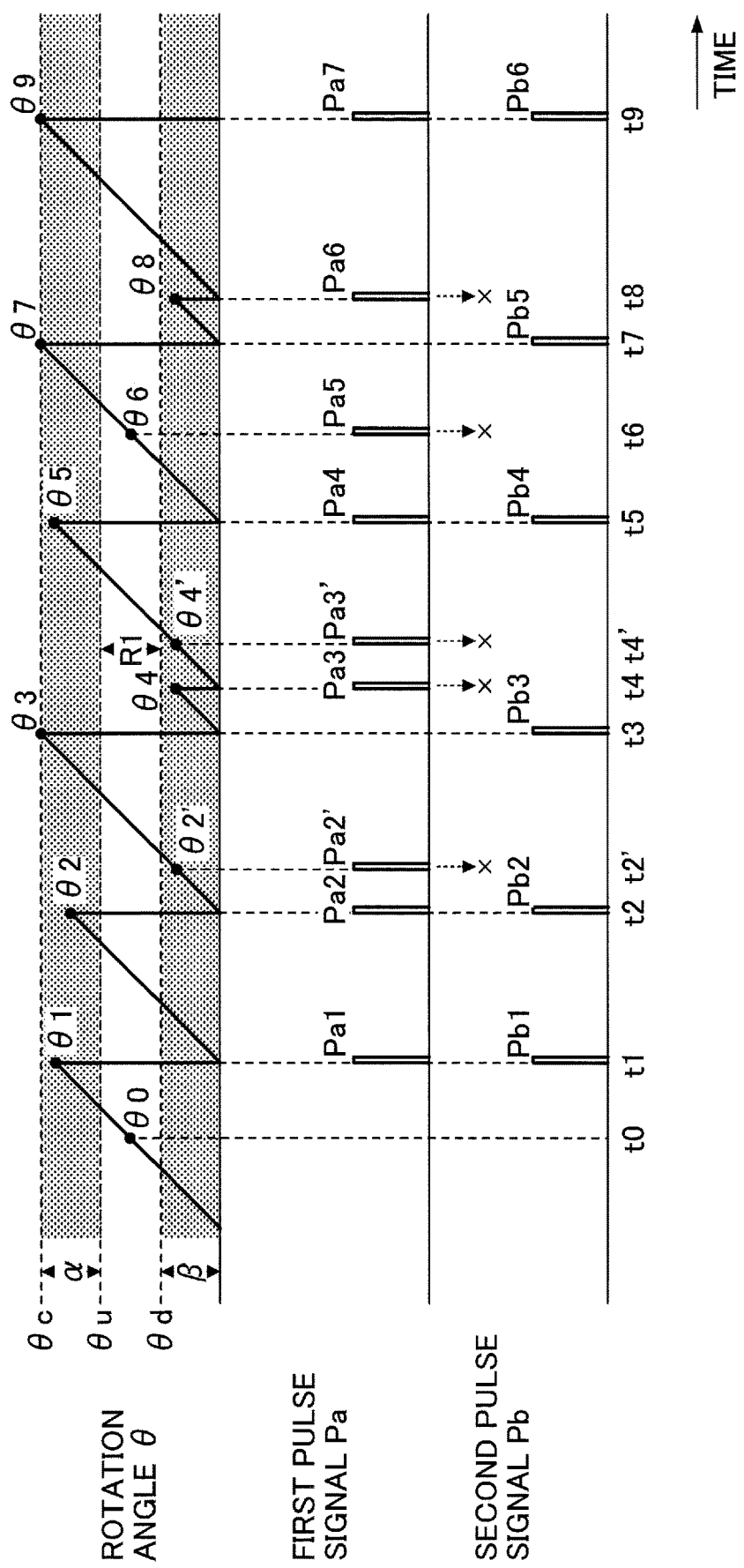

MOTOR MODULE, ROTATION ANGLE DETECTOR, AND METHOD FOR DETECTING FAILURE OF ROTATION ANGLE DETECTOR

CROSS-REFERENCE TO RELATED APPLICATIONS

The present application is a continuation-in-part application filed under 35 U.S.C. 111(a) claiming benefit under 35 U.S.C. 120 and 365(c) of PCT International Application No. PCT/JP2018/017513, filed on May 2, 2018, which is based on and claims priority to Japanese Patent Application No. 2017-093294 filed on May 9, 2017, the entire contents of which are incorporated herein by reference.

BACKGROUND OF THE INVENTION

1. Field of the Invention

An aspect of this disclosure relates to a motor module, a rotation angle detector, and a method for detecting failure of the rotation angle detector.

2. Description of the Related Art

There is a known device for controlling the speed of a direct-current motor (see, for example, Japanese Laid-Open Patent Publication No. H11-089263). This device includes a voltage controller that adjusts a supply voltage to match a command voltage V1 and applies the adjusted voltage to the direct-current motor, a speed detector that outputs a detected speed proportional to an actual rotation speed of the direct-current motor, and a current detector that amplifies a motor current of the direct-current motor and outputs a detected current. Also, this device includes a speed-detection-error determiner. When the detected speed is zero, the speed-detection-error determiner determines, based on the command voltage, the detected speed, and the detected current, whether the detection of a speed of zero is because of failure of the speed detector or because a large rotational load is rapidly applied to the direct-current motor.

However, because the device does not detect the voltage (inter-terminal voltage) between terminals of the direct-current motor, if the inter-terminal voltage is abnormal, the device may erroneously determine that the cause of the detection of a speed of zero is failure of the speed detector. Also, the device may erroneously determine that the cause of the detection of a speed of zero is failure of the speed detector even when the current detector fails.

SUMMARY OF THE INVENTION

In an aspect of this disclosure, there is provided a rotation angle detector including a rotational angular velocity calculator that calculates a rotational angular velocity of a motor based on an inter-terminal voltage of the motor detected by a voltage detector and a current flowing through the motor and detected by a current detector; a ripple detector that detects a ripple component included in the current; and a failure detector that detects a failure of any one of the voltage detector, the current detector, and the ripple detector based on an output from the voltage detector, an output from the current detector, and an output from the ripple detector. The failure detector determines that the failure has occurred when a state, where the outputs from two of the voltage detector, the current detector, and the ripple detector indicate normal rotation and the output from the remaining one of the voltage detector, the current detector, and the ripple detector does not indicate normal rotation, continues for a predetermined period of time.

BRIEF DESCRIPTION OF THE DRAWINGS

FIG. 4 is a timing chart illustrating an example of timings at which second pulse signals are generated;

DESCRIPTION OF THE PREFERRED EMBODIMENTS

In view of the above-described problems of the related-art technologies, an aspect of this disclosure makes it possible to more reliably detect failure of a device for obtaining information on the rotation of a direct-current commutator motor.

Figure 1:
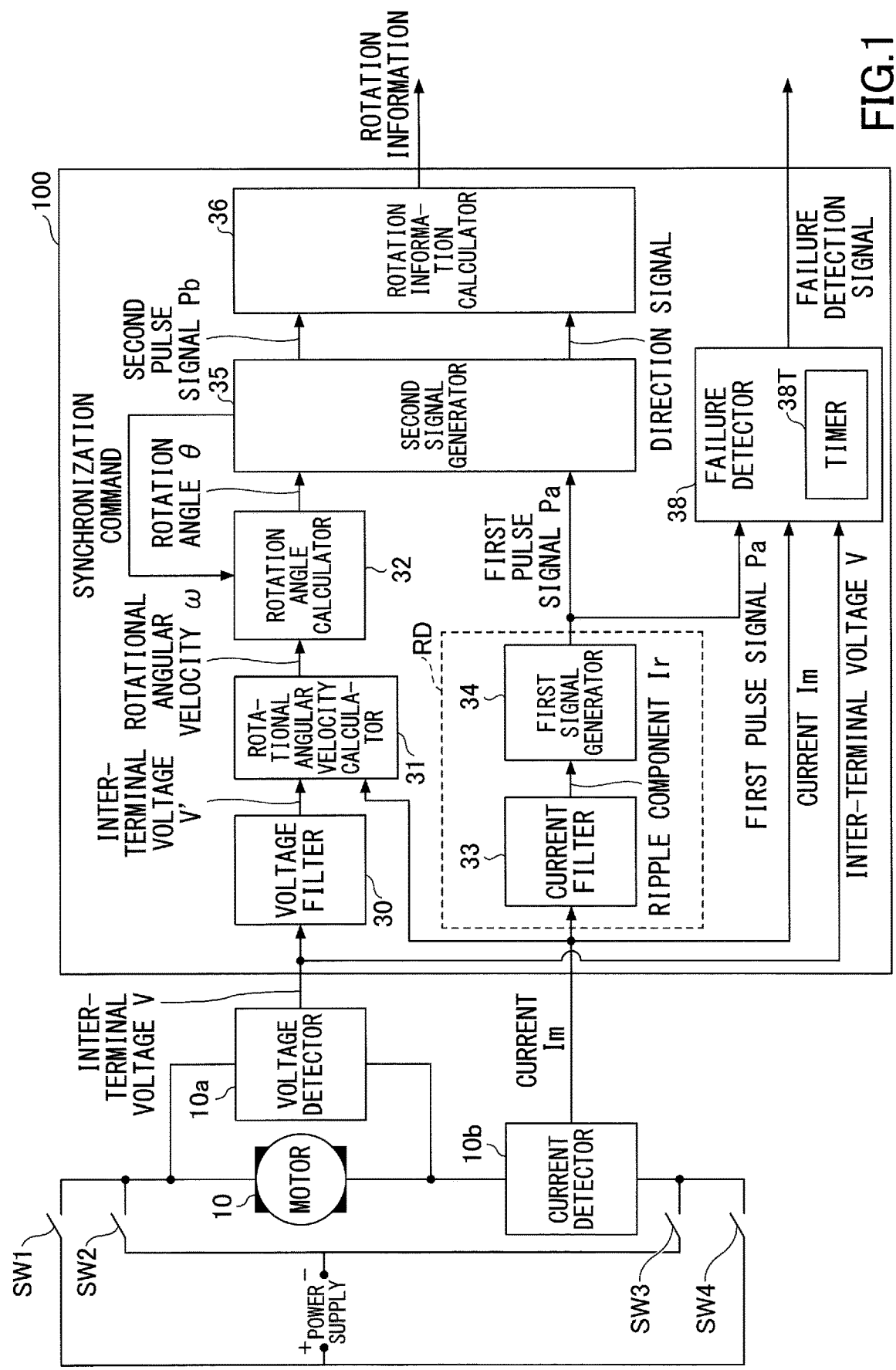
FIG. 1 is a block diagram illustrating an example of a configuration of a rotation angle detector according to an embodiment.

A rotation angle detector 100 according to an embodiment is described below with reference to drawings. FIG. 1 is a block diagram illustrating an example of a configuration of the rotation angle detector 100 according to the embodiment.

The rotation angle detector 100 detects a rotation angle of a motor 10. In the example of FIG. 1, the rotation angle detector 100 detects a rotation angle of the motor 10 based on an inter-terminal voltage V between terminals of the motor 10 and a current Im flowing through the motor 10.

The motor 10 is a direct current (DC) commutator motor including a commutator. The motor 10 is used, for example, to move a vehicle window up and down, to adjust the angle of a door mirror, to adjust the amount of air output from an air conditioner, and to adjust the optical axis of a headlight.

Figure 2:
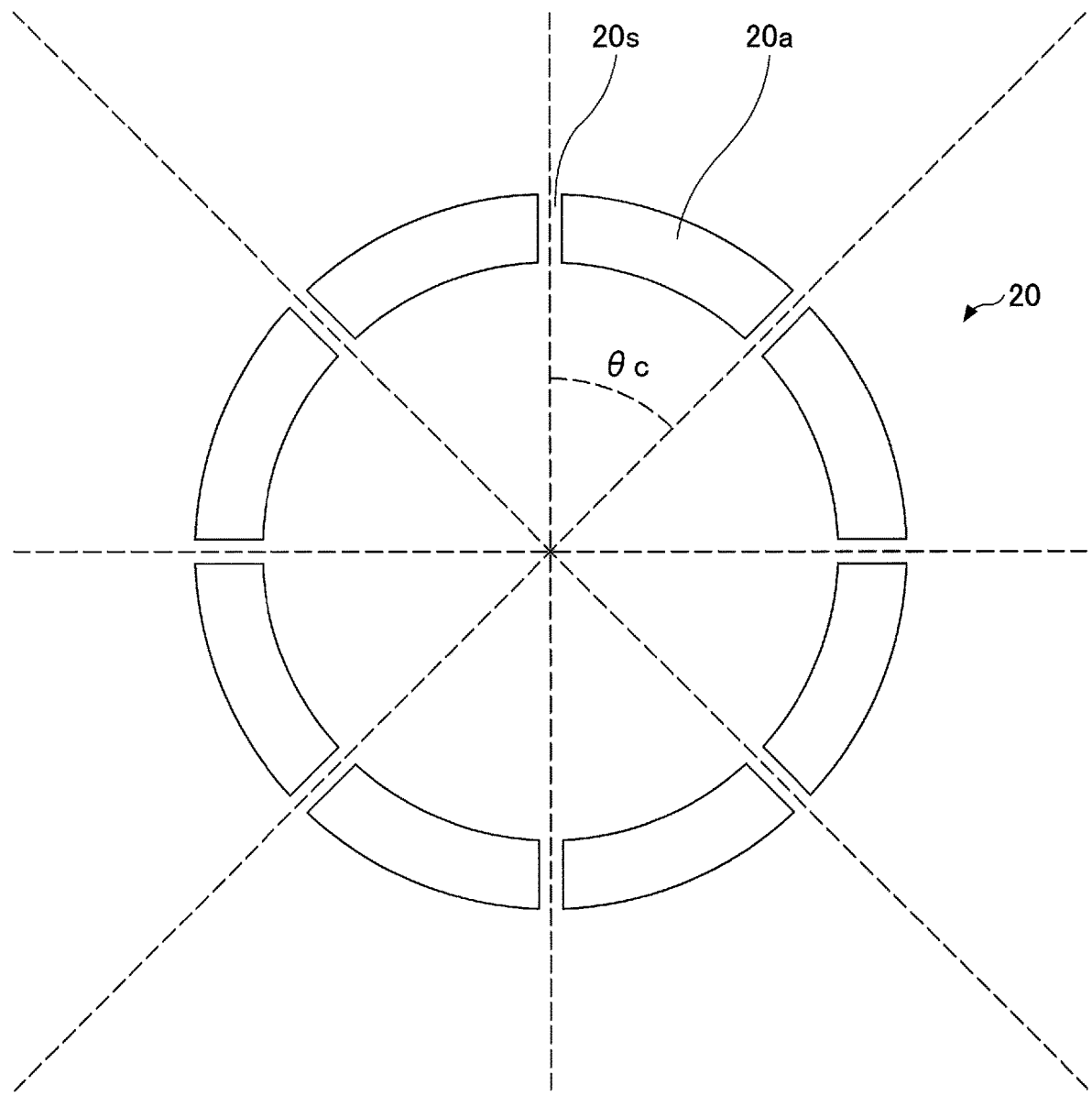
FIG. 2 is a drawing illustrating a commutator.

FIG. 2 is a schematic diagram of a commutator 20. As illustrated in FIG. 2, the commutator 20 includes eight commutator segments 20a that are separated from each other by slits 20s. An inter-slit angle θc, which is the central angle of an arc formed by each commutator segment 20a, is about 45 degrees.

As illustrated in FIG. 1, the motor 10 is connected to a power supply via four switches SW1 through SW4. The motor 10 rotates clockwise or forward when the switch SW1 and the switch SW3 are closed (turned on), and rotates counterclockwise or backward when the switch SW2 and the switch SW4 are closed (turned on). In the example of FIG. 1 where the motor 10 is connected to the power supply, an electric current flowing through the motor 10 rotating forward has a positive value, and an electric current flowing through the motor 10 rotating backward has a negative value. While the motor 10 is rotating by inertia, the switch SW2 and the switch SW3 are closed, an electric current flowing through the motor 10 rotating forward has a negative value, and an electric current flowing through the motor 10 rotating backward has a positive value. In the present embodiment, the motor 10 and a current detector 10b are in a closed loop so that a rotation during the inertial rotation can be detected. In the present embodiment, because the electrical resistance of the motor 10 is sufficiently high, the motor 10 rotates by inertia even if the two terminals of the motor 10 are short-circuited. On the other hand, if the electrical resistance of the motor 10 is low, the motor 10 quickly decelerates when the two terminals of the motor 10 are short-circuited. To suppress the deceleration of the motor 10 during inertial rotation, a closed loop passing through a resistor may be formed.

A voltage detector 10a is configured to detect the inter-terminal voltage V of the motor 10. A current detector 10b is configured to detect the current Im flowing through the motor 10.

The rotation angle detector 100 mainly includes a voltage filter 30, a rotational angular velocity calculator 31, a rotation angle calculator 32, a current filter 33, a first signal generator 34, a second signal generator 35, a rotation information calculator 36, and a failure detector 38. These components may be implemented by electric circuits or by software.

The voltage filter 30 smooths the waveform of the inter-terminal voltage V output from the voltage detector 10a. For example, the voltage filter 30 smooths the waveform of the inter-terminal voltage V so that the rotational angular velocity calculator 31 can accurately calculate the rotational angular velocity of the motor 10. In the example of FIG. 1, the voltage filter 30 is a low-pass filter and outputs an inter-terminal voltage V' that is obtained by removing, as noise, a high frequency component of the waveform of the inter-terminal voltage V output from the voltage detector 10a.

The rotational angular velocity calculator 31 is configured to calculate the rotational angular velocity of the motor 10 based on the inter-terminal voltage V of the motor 10 and the current Im flowing through the motor 10. In the example of FIG. 1, the rotational angular velocity calculator 31 calculates a rotational angular velocity ω according to formula (1) below.

$$\omega = \frac{1}{Ke} \times \left( V' - Im \times Rm - Lm \times \frac{dIm}{dt} \right) \quad (1)$$

In formula (1), Ke indicates a counter electromotive voltage constant, Rm indicates an internal resistance of the motor 10, Lm indicates an inductance of the motor 10, and dIm/dt indicates a one-time differential of the current Im. The one-time differential of the current Im is, for example, a difference between the previous value of the current Im and the current value of the current Im.

The rotational angular velocity calculator 31 calculates the rotational angular velocity ω of the motor 10 at each regular control period, and outputs the calculated rotational angular velocity ω to the rotation angle calculator 32.

The rotation angle calculator 32 is configured to calculate a rotation angle θ of the motor 10. The rotation angle calculator 32 calculates the rotation angle θ according to formula (2) below.

$$\theta = \int_0^t \omega \times dt \quad (2)$$

For example, the rotation angle calculator 32 calculates the rotation angle θ by integrating the rotational angular velocities ω output from the rotational angular velocity calculator 31 at regular control periods, and outputs a rotation angle signal indicating the calculated rotation angle θ to the second signal generator 35.

Also, the rotation angle calculator 32 resets the rotation angle θ to zero in response to a synchronization command from the second signal generator 35.

The current filter 33 outputs a ripple component Ir that is a specific frequency component included in the current Im output from the current detector 10b. Also, the current filter 33 constitutes a part of a ripple detector RD. The current filter 33 is implemented by a bandpass filter that passes a frequency of the ripple component Ir so that the first signal generator 34 can detect the ripple component Ir of the current Im. The current filter 33, which is implemented by a bandpass filter, removes frequency components other than the ripple component Ir from the waveform of the current Im output from the current detector 10b. The ripple component Ir used in the present embodiment is generated when the commutator segments 20a and the brush contact and separate from each other. Therefore, typically, an angle that the motor 10 rotates during one period of the ripple component Ir equals the inter-slit angle θc.

The first signal generator 34 generates a signal when it is estimated based on the waveform of the ripple component Ir that the motor 10 has rotated by a predetermined angle. This signal corresponds to the period of the ripple component Ir. The predetermined angle may correspond to one period or a half period of the ripple component Ir. In the present embodiment, each time the motor 10 rotates by the inter-slit angle θc, the first signal generator 34 estimates that the motor 10 has rotated by the predetermined angle based on the waveform of the ripple component Ir and generates a signal (the first pulse signal Pa). The first signal generator 34 constitutes a part of the ripple detector RD. For example, the first signal generator 34 generates the first pulse signal Pa based on the waveform of the ripple component Ir output from the current filter 33.

Figure 3A:
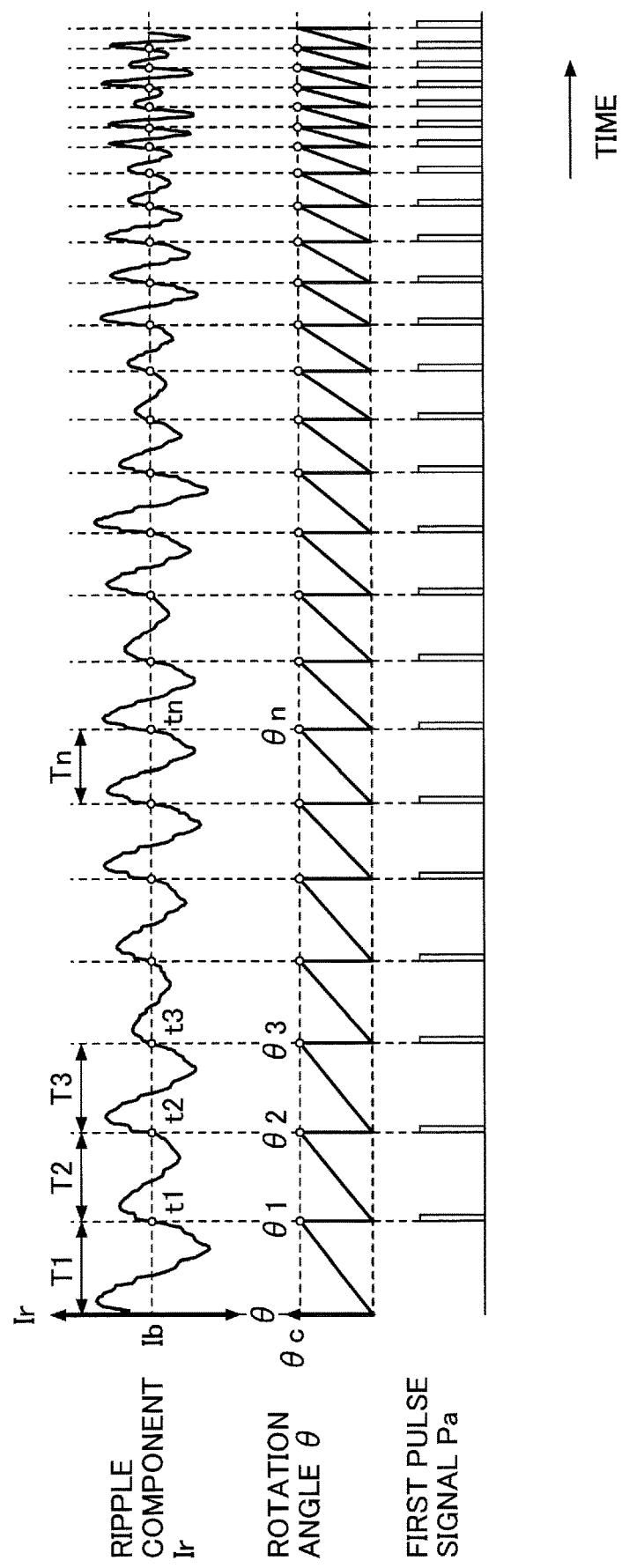
FIG. 3A is a timing chart illustrating an example of timings at which first pulse signals are generated.

FIG. 3A is a timing chart illustrating an example of timings at which the first signal generator 34 generates first pulse signals Pa. The first signal generator 34 generates the first pulse signal Pa for each period of the ripple component Ir. For example, the first signal generator 34 generates the first pulse signal Pa each time the ripple component Ir exceeds a reference current value Ib. In the example of FIG. 3A, the first signal generator 34 generates first pulse signals Pa at times t1, t2, t3, . . . , and tn. T1, T2, T3, . . . , and Tn indicate periods of the ripple component Ir; and θ1, θ2, θ3, . . . , and θn indicate the rotation angles θ at the times when the first signal generator 34 generates the first pulse signals Pa. The rotation angles θ are calculated by the rotation angle calculator 32. As illustrated in FIG. 3A, each of the rotation angles θ1, θ2, θ3, . . . , and θn is equal to the inter-slit angle θc. Thus, the first signal generator 34 typically generates the first pulse signal Pa each time the rotation angle θ increases by the inter-slit angle θc, i.e., when a state where the rotational angular velocity ω is not zero continues. On the other hand, the first signal generator 34 typically does not generates the first pulse signal Pa when a state where the rotation angle θ is less than the inter-slit angle θc (e.g., zero) continues, i.e., when a state where the rotational angular velocity ω is zero continues.

Here, when, for example, the current Im and its ripple component Ir become small during an inertial rotation period after the motor 10 is powered off, the first signal generator 34 may not be able to detect the ripple component Ir and generate the first pulse signal Pa. Also, when, for example, a rush current is generated immediately after the motor 10 is powered on, the first signal generator 34 may erroneously generate the first pulse signal Pa in response to the rush current. Such a generation failure and erroneous generation of the first pulse signal Pa may reduce the reliability of information (rotation information) on the rotation of the motor 10 output by the rotation angle detector 100.

For the above reason, the rotation angle detector 100 includes the second signal generator 35 that can more accurately generate a signal indicating the rotation angle of the motor 10.

The second signal generator 35 is configured to generate a signal indicating that the motor 10 has rotated by a predetermined angle. The second signal generator 35 may be configured to generate a second pulse signal Pb for every inter-slit angle θc based on a rotation angle signal output from the rotation angle calculator 32 and the first pulse signal Pa output from the first signal generator 34. The second pulse signal Pb is an example of information indicating that the motor 10 has rotated by a predetermined angle. Because the first pulse signal Pa is generated when the rotation of the motor 10 by the predetermined angle is estimated based solely on the waveform of the ripple component Ir, the first pulse signal Pa tends to be output erroneously. On the other hand, the second pulse signal Pb is generated when the rotation of the motor 10 by the predetermined angle is estimated based on both of the first pulse signal Pa and the rotation angle signal, a difference between the rotation angle θ calculated based on the second pulse signal Pb and an actual rotation angle can be made less than or equal to a predetermined value.

Figure 3B:
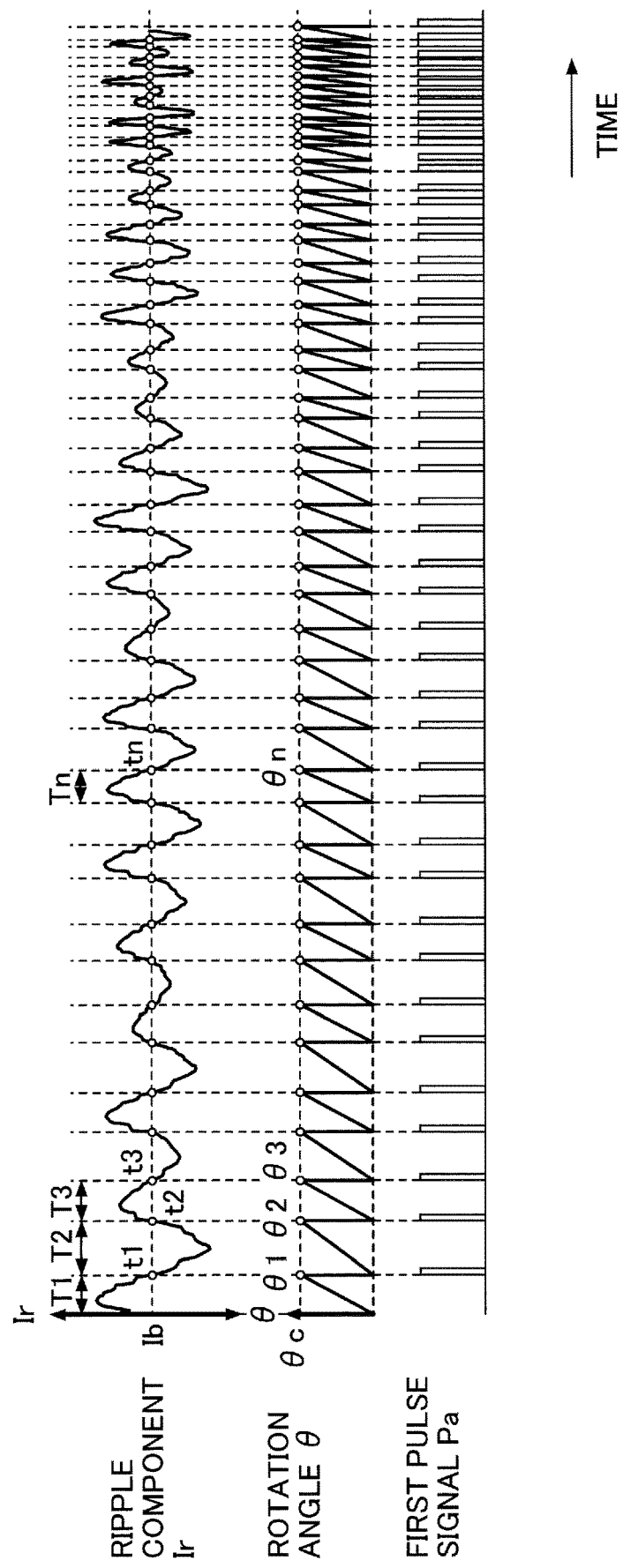
FIG. 3B is a timing chart illustrating another example of timings at which first pulse signals are generated.

FIG. 3B is a timing chart illustrating another example of timings at which the first signal generator 34 generates first pulse signals Pa. The example of FIG. 3B is different from the example of FIG. 3A in that the first signal generator 34 generates the first pulse signal Pa for each half period of the ripple component Ir. In the example of FIG. 3B the first signal generator 34 generates the first pulse signal Pa each time the ripple component Ir crosses the reference current value Ib.

FIG. 4 is a timing chart illustrating an example of timings at which the second signal generator 35 generates second pulse signals Pb. In FIG. 4, a first threshold θu and a second threshold θd are thresholds for determining whether the first pulse signal Pa is acceptable and are set based on, for example, the maximum phase difference between the rotation angle θ and the actual rotation angle of the motor 10.

The second signal generator 35 generates the second pulse signal Pb based on the "initial" first pulse signal Pa that is generated by the first signal generator 34 for the first time while the rotation angle θ is greater than or equal to the first threshold θu and less than the inter-slit angle θc. The first threshold θu may be set in advance or may be set dynamically. In FIG. 4, an acceptable range where the rotation angle θ is greater than or equal to the first threshold θu and less than the inter-slit angle θc is indicated by a dot pattern. In the example of FIG. 4, rotation angles θ1, θ2, and θ5 received when the first pulse signals Pa1, Pa2, and Pa4 are generated by the first signal generator 34 are greater than or equal to the first threshold θu and less than the inter-slit angle θc. That is, the remaining angle necessary for each of the rotation angles θ1, θ2, and θ5 to reach the inter-slit angle θc is less than an angle α. For example, the angle α is set based on the maximum difference between the rotation angle θ and the actual rotation angle of the motor 10. In this case, the second signal generator 35 assumes that the first pulse signals Pa1, Pa2, and Pa5 generated by the first signal generator 34 at times t1, t2, and t5 are not noise. Accordingly, the second signal generator 35 generates second pulse signals Pb1, Pb2, and Pb4 at times t1, t2, and t5. After generating the second pulse signal Pb, the second signal generator 35 outputs a synchronization command to the rotation angle calculator 32. Here, if noise having the same frequency component as the ripple component Ir is generated when the rotation angle θ is less than the inter-slit angle θc and greater than or equal to the first threshold θu, an erroneous first pulse signal Pa may be output and the second pulse signal Pb may be generated. However, at the next timing, a true ripple component Ir is detected, and the rotation angle detector 100 can detect a correct rotation angle. Accordingly, even if an erroneous rotation angle (that is deviated from an actual rotation angle) is temporarily detected by the rotation angle detector 100 due to noise, the rotation angle returns to a correct rotation angle (that is the same as the actual rotation angle or close to the actual rotation angle). Also, the error is less than the angle α and is practically acceptable.

Also, the second signal generator 35 generates the second pulse signal Pb when the rotation angle θ reaches a predetermined angle. The predetermined angle is, for example, the inter-slit angle θc. However, the rotation angle θ is calculated by the rotation angle calculator 32 and includes an error. In the example of FIG. 4, the second signal generator 35 generates second pulse signals Pb3, Pb5, and Pb6 when the absolute values of rotation angles θ3, θ7, and θ9 reach the inter-slit angle θc at times t3, t7, and t9. After generating the second pulse signal Pb, the second signal generator 35 outputs a synchronization command to the rotation angle calculator 32. When receiving the synchronization command, the rotation angle calculator 32 resets the rotation angle θ to zero.

That is, the second signal generator 35, for example, generates the second pulse signal Pb3 if the absolute value of the rotation angle θ reaches the inter-slit angle θc before receiving the first pulse signal Pa after the second pulse signal Pb2 is generated at time t2.

Thus, the second signal generator 35 generates the second pulse signal Pb as long as the absolute value of the rotation angle θ calculated by the rotation angle calculator 32 reaches the inter-slit angle θc even if the first pulse signal Pa is not generated for some reason. Thus, the second signal generator 35 can reliably prevent the calculation of rotation information from being influenced by the generation failure of the first pulse signal Pa.

On the other hand, the second signal generator 35 does not generate the second pulse signal Pb if the rotation angle θ received when the first pulse signal Pa is generated by the first signal generator 34 is less than the second threshold θd. The second threshold θd may be set in advance or may be set dynamically. Typically, the above situation occurs after the rotation angle θ reaches the predetermined angle and the second pulse signal Pb is generated. In FIG. 4, an acceptable range where the rotation angle θ is greater than or equal to zero and less than the second threshold θd is indicated by a dot pattern. In the example of FIG. 4, the first signal generator 34 generates the first pulse signal Pa3 at time t4 that is after the absolute value of the rotation angle θ reaches the inter-slit angle θc at time t3 and the second pulse signal Pb3 is generated. At time t4, a rotation angle θ4 is less than the second threshold θd. That is, the rotation angle θ4 calculated after the rotation angle θ is reset at time t3 is still less than an angle β. In this case, the second signal generator 35 can determine that the first pulse signal Pa3 generated by the first signal generator 34 at time t4 can be integrated with the second pulse signal Pb3 generated at time t3. Specifically, this situation occurs when the rotation angle θ output from the rotation angle calculator 32 reaches the inter-slit angle θc before the actual rotation angle of the motor 10 reaches the inter-slit angle θc. That is, this situation occurs when the second pulse signal Pb3 is generated because the rotation angle θ calculated by the rotation angle calculator 32 reaches the inter-slit angle θc even though the actual rotation angle has not reached the inter-slit angle θc. The time when the first pulse signal Pa3 is generated immediately after the generation of the second pulse signal Pb3 corresponds to the moment when the actual rotation angle reaches the inter-slit angle θc. Therefore, the second signal generator 35 outputs a synchronization command to the rotation angle calculator 32 when the first pulse signal Pa3 is generated. In this case, the second signal generator 35 does not generate the second pulse signal Pb at time t4. In FIG. 4, a dotted arrow leading to "X" indicates that no second pulse signal Pb is generated based on the first pulse signal Pa3. The same applies to the dotted arrows leading to "X" in other figures.

Also, there is a case where the first signal generator 34 consecutively generates first pulse signals Pa in a short period of time. As described above, in FIG. 3A, the first signal generator 34 generates the first pulse signal Pa each time the ripple component Ir exceeds the reference current value Ib. For this reason, immediately before or after the ripple component Ir exceeds the reference current value Ib, the first pulse signal Pa is erroneously generated even when small noise is superimposed. In this case, the interval at which the first signal generator 34 generates the first pulse signal Pa becomes less than the angle β (the second threshold θd). In the example of FIG. 4, the first signal generator 34 generates the first pulse signal Pa2 at time t2. The second signal generator 35 generates the second pulse signal Pb2 and outputs the synchronization command to the rotation angle calculator 32. The rotation angle calculator 32 resets the rotation angle θ. Then, the first signal generator 34 generates a first pulse signal Pa2' at time t2'. The rotation angle θ at time t2' is less than the second threshold θd. In this case, the second signal generator 35 does not generate the second pulse signal Pb and does not output the synchronization command. In FIG. 4, a dotted arrow leading to "X" indicates that no second pulse signal Pb is generated based on the first pulse signal Pa2'. Here, if small noise is superimposed immediately before or after the ripple component Ir exceeds the reference current value Ib, the second signal generator 35 cannot determine which one of multiple first pulse signals Pa generated consecutively in a short period of time indicates that the rotation angle θ has reached the inter-slit angle θc. In this case, however, because the multiple first pulse signals Pa are generated within a short period of time (while the rotation angle θ is less than the angle β), there is no practical problem in assuming that the rotation angle θ has reached the inter-slit angle θc when the initial first pulse signal Pa is generated. Also, even if similar noise is generated each time the ripple component Ir exceeds the reference current value Ib, the error is kept less than the angle β. In other words, errors are not accumulated. Therefore, the second signal generator 35 can keep the error within a practically acceptable range.

Also, if the rotation angle θ received when the first pulse signal Pa is generated by the first signal generator 34 is greater than or equal to the second threshold θd and less than the first threshold θu, i.e., if the rotation angle θ is within an angle range R1, the second signal generator 35 neither generates the second pulse signal Pb nor outputs the synchronization signal to the rotation angle calculator 32. In the example of FIG. 4, a rotation angle θ6 received when a first pulse signal Pa5 is generated by the first signal generator 34 at time t6 is greater than or equal to the second threshold θd and less than the first threshold θu. That is, the remaining angle necessary for the rotation angle θ6 to reach the inter-slit angle θc is greater than the angle α, and the rotation angle θ6 calculated after the rotation angle θ is reset at time t5 is greater than or equal to the angle β. In this case, the second signal generator 35 can determine that the first pulse signal Pa5 is based on noise. Accordingly, at time t6, the second signal generator 35 neither generates the second pulse signal Pb nor outputs the synchronization command to the rotation angle calculator 32. Thus, the second signal generator 35 eliminate the influence of the first pulse signal Pa5 that is based on noise.

Also, the second signal generator 35 does not generate the second pulse signal Pb if the rotation angle θ received when the first pulse signal Pa is generated by the first signal generator 34 is less than the second threshold θd. Here, when the rotation angle θ, which is received when the first pulse signal Pa is generated by the first signal generator 34, is less than the second threshold θd, there is a case where the second signal generator 35 outputs the synchronization command to the rotation angle calculator 32 and a case where the second signal generator 35 does not output the synchronization command to the rotation angle calculator 32. If the first pulse signal Pa is generated when the rotation angle θ is less than the second threshold θd after the rotation angle θ reaches the inter-slit angle θc before the generation of the first pulse signal Pa, the second signal generator 35 transmits a synchronization command to the rotation angle calculator 32. However, if multiple first pulse signals Pa are generated while the rotation angle θ is less than the second threshold θd after the rotation angle θ reaches the inter-slit angle θc before the generation of the first pulse signal Pa, the second signal generator 35 ignores the second or subsequent first pulse signals Pa. That is, the second signal generator 35 does not output the synchronization command. If the first pulse signal Pa is generated when the rotation angle θ is less than the second threshold θd after the first pulse signal Pa is generated before the rotation angle θ reaches the inter-slit angle θc, the second signal generator 35 does not output the synchronization command. That is, if multiple first pulse signals Pa are generated while the rotation angle θ is less than the second threshold θd (angle β), the second and subsequent first pulse signals Pa are ignored. That is, the second signal generator 35 does not output the synchronization command. In the example of FIG. 4, a rotation angle θ4' received when a first pulse signal Pa3' is generated by the first signal generator 34 at time t4' is less than the second threshold θd. However, the first pulse signal Pa3' is the second first pulse signal Pa generated after the latest second pulse signal Pb3 is generated. Therefore, when receiving the first pulse signal Pa3', the second signal generator 35 does not generate the second pulse signal Pb and does not output the synchronization command to the rotation angle calculator 32.

With the above configuration, the rotation angle detector 100 can keep the detection error in the rotation angle θ of the motor 10 within a practically acceptable range. Particularly, in the rotation angle detector 100, errors are not accumulated. For this reason, the rotation angle detector 100 can keep errors within a predetermined range regardless of the rotation speed of the motor 10. The inventors have found out the following conditions and invented the rotation angle detector 100 described above. (1) False detection of the ripple component Ir due to small noise is limited to a timing immediately before or after the ripple component Ir exceeds the reference current value Ib. In this case, an erroneous first pulse signal Pa is generated only in a short period of time before and after the correct generation of the first pulse signal Pa. The short period of time is, for example, between a time when the rotation angle θ reaches the first threshold θu and a time when the rotation angle θ reaches the second threshold θd. (2) Large noise is generated by, for example, a rush current generated immediately after power is turned on, and is generated at an interval that is sufficiently longer than an interval corresponding to the second angle θc. (3) An error in the rotation angle θ calculated by the rotation angle calculator 32 based on the inter-terminal voltage V' and the current Im is sufficiently smaller than the inter-slit angle θc.

With the above configuration, for example, the second signal generator 35 can generate the second pulse signal Pb even when the current Im and its ripple component Ir become small in an inertial rotation period after the motor 10 is powered off and the first signal generator 34 cannot generate the first pulse signal Pa based on the waveform of the ripple component Ir.

Also, when, for example, a rush current is generated immediately after the motor 10 is powered on and the first signal generator 34 erroneously generates the first pulse signal Pa according to the rush current, the second signal generator 35 does not generate the second pulse signal Pb corresponding to the first pulse signal Pa. That is, the second signal generator 35 can eliminate the influence of the first pulse signal Pa.

Also, for example, even when the first signal generator 34 erroneously generates the first pulse signal Pa due to the influence of noise, the second signal generator 35 does not generate the second pulse signal Pb corresponding to the first pulse signal Pa and does not output the synchronization command to the rotation angle calculator 32.

Thus, the rotation angle detector 100 calculates rotation information of the motor 10 based on the second pulse signal Pb that is generated based on both of the first pulse signal Pa and the rotation angle signal. This configuration makes it possible to improve the reliability of the rotation information of the motor 10.

The second signal generator 35 also outputs a direction signal indicating the rotation direction of the motor 10. For example, the second signal generator 35 outputs a positive value as the rotation angle θ when the rotation direction is the forward rotation direction and outputs a negative value as the rotation angle θ when the rotation direction is the backward rotation direction. The rotation angle θ takes a positive value when the electric current flowing through the motor 10 is positive and takes a negative value when the electric current flowing through the motor 10 is negative. During inertial rotation, however, the rotation angle θ takes a positive value when the electric current flowing through the motor 10 is negative and takes a negative value when the electric current flowing through the motor 10 is positive.

The rotation information calculator 36 is configured to calculate rotation information of the motor 10. The rotation information of the motor 10 includes, for example, a rotation amount (rotation angle) from a reference rotation position or the number of rotations from the reference rotation position. When the motor 10 is used to move a vehicle window up and down, the rotation information of the motor 10 may be converted into a relative position of the upper edge of the window relative to a reference position or an opening amount of the window. The rotation information may also include statistics such as an average, the largest value, the smallest value, and a mean value of the rotational angular velocity ω in a given period. In the example of FIG. 1, the rotation information calculator 36 calculates rotation information of the motor 10 based on outputs from the second signal generator 35. For example, the rotation amount after the motor 10 starts rotating can be calculated by multiplying the number of second pulse signals Pb generated after the motor 10 starts rotating by the inter-slit angle θc. In this process, the rotation information calculator 36 determines whether to increment or decrement the number of the second pulse signals Pb based on direction signals output from the second signal generator 35 together with the second pulse signals Pb. Alternatively, the rotation information calculator 36 may be configured to separately count the number of second pulse signals Pb received together with direction signals indicating the forward rotation direction and the number of second pulse signals Pb received together with direction signals indicating the backward rotation direction, and to calculate the rotation amount of the motor 10 based on the difference between the counted numbers.

The failure detector 38 is configured to detect a failure in the rotation angle detector 100. In the present embodiment, the failure detector 38 detects a failure of each of the voltage detector 10a, the current detector 10b, and the ripple detector RD (detection targets) based on whether the output from each of the voltage detector 10a, the current detector 10b, and the ripple detector RD indicates a normal rotation. When a failure is detected, the failure detector 38 outputs a failure detection signal to an external device.

When an abnormal state, where outputs from two of the voltage detector 10a, the current detector 10b, and the ripple detector RD indicate normal rotation and an output from the remaining one of the voltage detector 10a, the current detector 10b, and the ripple detector RD does not indicate normal rotation, continues for a predetermined period of time, the failure detector 38 determines that the remaining one of the voltage detector 10a, the current detector 10b, and the ripple detector RD is at fault.

For example, when a first abnormal state, where an output from the voltage detector 10a indicates normal rotation, an output from the current detector 10b indicates normal rotation, and an output from the ripple detector RD does not indicate normal rotation, continues for a predetermined period of time, the failure detector 38 determines that the ripple detector RD is at fault.

The first abnormal state is, for example, a state where the rotational angular velocity ω calculated based on outputs from the voltage detector 10a and the current detector 10b is not zero, but the ripple detector RD is not outputting the first pulse signal Pa.

The normal ranges of the current Im, the period T, and the inter-terminal voltage V are set in advance in, for example, a non-volatile memory. Alternatively, the normal ranges may be dynamically calculated or set. The normal ranges (hereafter referred to as "first normal ranges") are the ranges of values that are observed while the motor 10 is rotating normally. The normal ranges do not include the ranges of normal values that are observed while the motor 10 is stopped.

As another example, when a second abnormal state, where an output from the voltage detector 10a is within a voltage range indicating normal rotation, an output from the current detector 10b is outside of a current range indicating normal rotation, and a signal indicating normal rotation is output from the ripple detector RD, continues for a predetermined period of time, the failure detector 38 determines that the current detector 10b is at fault.

The second abnormal state is, for example, a state where the current Im is outside of the first normal range even though the inter-terminal voltage V is within the first normal range and the period T of the first pulse signal Pa is within the first normal range.

The magnitude of the current Im within the normal range is, for example, less than or equal to the magnitude of a stall current. For example, the stall current is calculated by dividing the inter-terminal voltage V by the internal resistance Rm and multiplying the quotient by a factor K1. The factor K1 may be a fixed value or a variable.

As another example, when a third abnormal state, where an output from the voltage detector 10a is outside of a voltage range indicating normal rotation, an output from the current detector 10b is within a current range indicating normal rotation, and a signal indicating normal rotation is output from the ripple detector RD, continues for a predetermined period of time, the failure detector 38 determines that the voltage detector 10a is at fault.

The third abnormal state is, for example, a state where the inter-terminal voltage V is outside of the first normal range even though the current Im is within the first normal range and the period T of the first pulse signal Pa output from the ripple detector RD is within the first normal range.

The failure detector 38 includes a timer 38T for counting the duration of an abnormal state as a decision suspension time. The decision suspension time indicates a time for which the decision that a detection target is at fault is suspended. When the decision suspension time counted by the timer 38T exceeds a predetermined period, the failure detector 38 determines that one of the detection targets, which is in the abnormal state and whose output is different from an output indicating normal rotation, is at fault.

Figure 5:
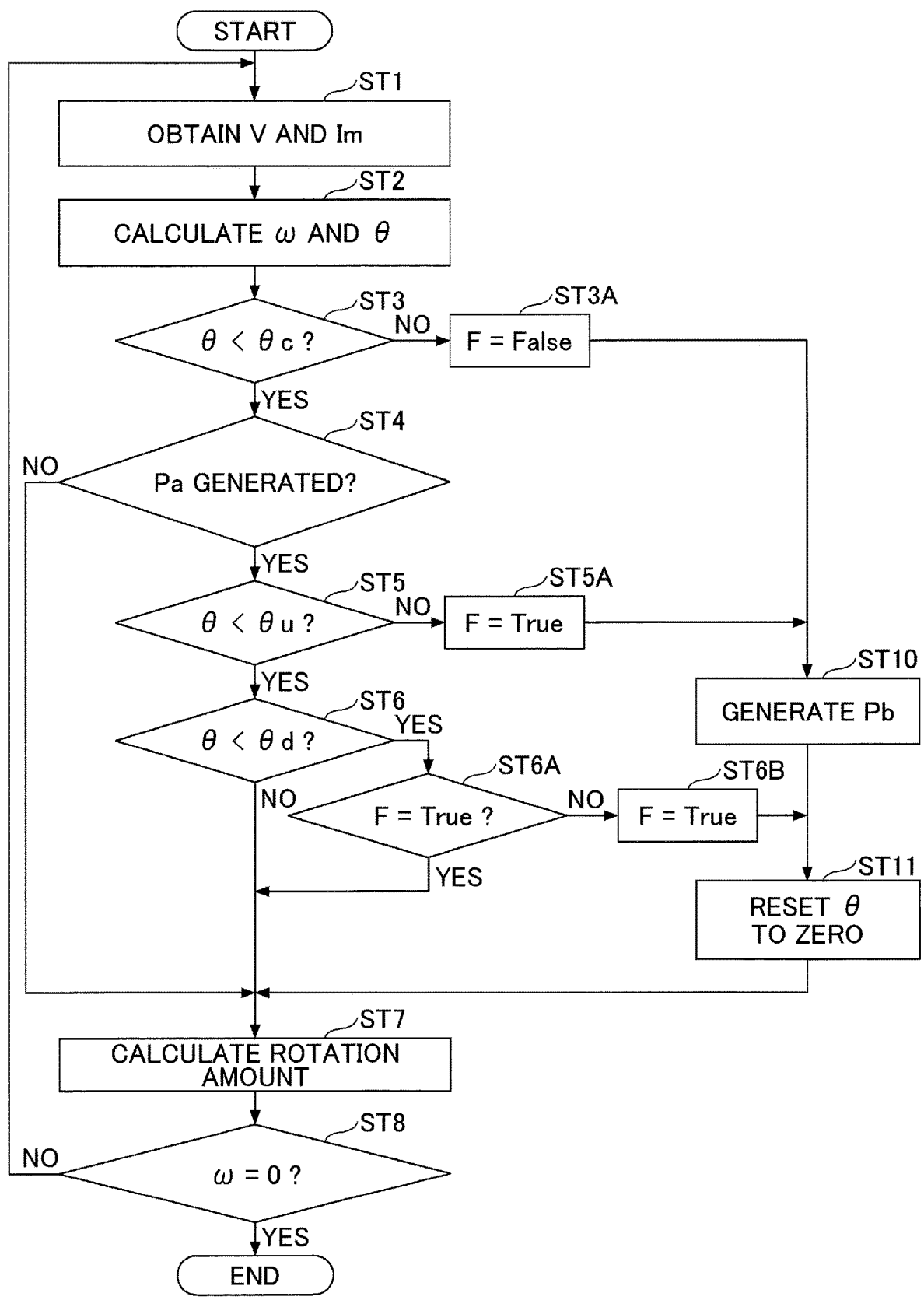
FIG. 5 is a flowchart illustrating a rotation-amount calculation process.

Next, a process (which is hereafter referred to as a "rotation-amount calculation process") performed by the rotation angle detector 100 to calculate a rotation amount of the motor 10 is described with reference to FIG. 5. FIG. 5 is a flowchart illustrating the rotation-amount calculation process. The rotation angle detector 100 performs the rotation-amount calculation process while the motor 10 is being driven.

First, the rotation angle detector 100 obtains the inter-terminal voltage V and the current Im (step ST1). In the example of FIG. 1, the rotation angle detector 100 obtains the inter-terminal voltage V output from the voltage detector 10a and the current Im output from the current detector 10b at each predetermined control period.

Next, the rotation angle detector 100 calculates the rotational angular velocity ω and the rotation angle θ (step ST2). In the example of FIG. 1, the rotational angular velocity calculator 31 of the rotation angle detector 100 calculates the rotational angular velocity ω at each predetermined control period by inserting the inter-terminal voltage V and the current Im in formula (1). Then, the rotation angle calculator 32 of the rotation angle detector 100 calculates the rotation angle θ by integrating rotational angular velocities ω calculated at the respective control periods.

Next, the rotation angle detector 100 determines whether the rotation angle θ is less than a predetermined angle (step ST3). In the example of FIG. 1, the second signal generator 35 of the rotation angle detector 100 determines whether the rotation angle θ is less than the inter-slit angle θc.

When determining that the rotation angle θ is greater than or equal to the inter-slit angle θc (NO at step ST3), the second signal generator 35 determines that the first pulse signal Pa has not been generated before the rotation angle θ reaches the inter-slit angle θc. In this case, the second signal generator 35 sets a flag F to False to indicate that the first pulse signal Pa has not been generated (step ST3A). The flag F indicates whether the first pulse signal Pa has been generated. The initial value of the flag F is "False" indicating that the first pulse signal Pa has not been generated. If the flag F is set to True, it indicates that the first pulse signal Pa has already been generated. Then, the second signal generator 35 generates the second pulse signal Pb (step ST10), and resets the rotation angle θ to zero (step ST11). These steps are performed when the rotation angle θ reaches the inter-slit angle θc before the first pulse signal Pa is generated. In the example of FIG. 4, these steps are performed in each of the cases where the rotation angle A reaches the rotation angles θ3, θ7, and θ9 at times t3, t7, and t9, respectively.

On the other hand, when determining that the rotation angle θ is less than the inter-slit angle θc (YES at step ST3), the second signal generator 35 determines whether the first pulse signal Pa has been generated (step ST4). In the example of FIG. 1, the second signal generator 35 determines whether the first pulse signal Pa has been generated by the first signal generator 34.

When the second signal generator 35 determines that the first pulse signal Pa has not been generated (NO at step ST4) in a stage where the rotation angle θ is less than the inter-slit angle θc (YES at step ST3), the rotation angle detector 100 calculates a rotation amount (step ST7). Then, the rotation information calculator 36 calculates a rotation amount of the motor 10 based on outputs from the second signal generator 35. In this case, there is no change in the calculated rotation amount. That is, the previously-calculated rotation amount is the same as the currently-calculated rotation amount. In the example of FIG. 4, these steps are performed when the rotation angle θ is the rotation angle θ0 at time t0.

Next, the rotation angle detector 100 determines whether the rotational angular velocity ω has become zero (step ST8). When it is determined that the rotational angular velocity ω has not become zero (NO at step ST8), the rotation angle detector 100 returns to step ST1. When it is determined that the rotational angular velocity ω has become zero (YES at step ST8), the rotation angle detector 100 ends the rotation-amount calculation process.

When determining that the first pulse signal Pa has been generated (YES at step ST4), the second signal generator 35 determines whether the rotation angle θ is less than the first threshold θu (step ST5). This is because the first pulse signal Pa generated at a timing at which the rotation angle A is less than the first threshold θu is highly probably generated based on noise.

When determining that the rotation angle θ is greater than or equal to the first threshold θu (NO at step ST6), the second signal generator 35 sets the flag F to "True" to indicate that the first pulse signal Pa has been generated (step ST5A). Then, the second signal generator 35 generates the second pulse signal Pb (step ST10), and resets the rotation angle θ to zero (step ST11). This is because if the first pulse signal Pa is generated when the rotation angle θ is greater than or equal to the first threshold θu, the actual rotation angle at the time when the first pulse signal Pa is generated is close to the inter-slit angle θc. In the example of FIG. 4, these steps are performed in each of the cases where the first pulse signals Pa1, Pa2, and Pa4 are generated at times t1, t2, and t5.

When the rotation angle θ is less than the first threshold θu (YES at step ST5), the second signal generator 35 cannot determine at this stage that the first pulse signal Pa is not based on noise. This is because the second signal generator 35 cannot determine which one of the timing when the rotation angle θ reaches the inter-slit angle θc and the generation timing of the first pulse signal Pa is earlier than the other. That is, the timing when the rotation angle θ reaches the inter-slit angle θc and the generation timing of the first pulse signal Pa may become different from each other. This is because the rotation angle θ may include a slight error, and the generation timing of the first pulse signal Pa may slightly vary due to, for example, noise. For the above reasons, the second signal generator 35 determines whether the rotation angle θ is less than the second threshold θd when the first pulse signal Pa that is received for the first time after the generation of the latest second pulse signal Pb (step ST6).

When determining that the rotation angle θ related to the first pulse signal Pa is less than the second threshold θd (YES at step ST6), the second signal generator 35 refers to the value of the flag F (step ST6A). The flag F is used to determine whether first pulse signals Pa have been generated consecutively. If the flag F is "True", the first pulse signal Pa is the second or subsequent first pulse signal Pa of the first pulse signals Pa that have been generated consecutively. Therefore, if the flag F is "True" (YES at step ST6A), the rotation angle detector 100 calculates a rotation amount (step ST7). In the example of FIG. 4, these steps are performed in each of the cases where the first pulse signals Pa2' and Pa3' are generated at times t2' and t4'. If the flag F is "False" (NO at step ST6A), the second signal generator 35 sets the flag F to "True" (step ST6B). Then, the second signal generator 35 resets the rotation angle θ to zero (step ST11). This is because when the rotation angle θ is less than the second threshold θd, the actual rotation angle at the time when the first pulse signal Pa is generated is close to the inter-slit angle θc. In other words, when the rotation angle θ is less than the second threshold θd, the second signal generator 35 can determine that the first pulse signal Pa corresponds to the second pulse signal Pb generated immediately before the generation of the first pulse signal Pa. In the example of FIG. 4, these steps are performed in each of the cases where the first pulse signals Pa3 and Pa6 are generated at times t4 and t8. That is, the second signal generator 35 can determine that the first pulse signals Pa3 and Pa6 correspond to the second pulse signals Pb3 and Pb5.

When it is determined that the rotation angle θ related to the first pulse signal Pa is greater than or equal to the second threshold θd (NO at step ST6), i.e., when it is determined that the rotation angle θ is within the angle range R1, the second signal generator 35 determines that the first pulse signal Pa is based on noise. In this case, the second signal generator 35 neither generates the second pulse signal Pb nor resets the rotation angle θ. Then, the rotation information calculator 36 calculates a rotation amount of the motor 10 based on outputs from the second signal generator 35. In the example of FIG. 4, these steps are performed when the first pulse signal Pa5 is generated at time t6. That is, the second signal generator 35 determines that the first pulse signal Pa5 is based on noise.

Then, the rotation angle detector 100 calculates the rotation amount of the motor 10 (step ST7). In the example of FIG. 1, the rotation information calculator 36 of the rotation angle detector 100 calculates the rotation amount after the motor 10 starts rotating by multiplying the number of the second pulse signals Pb generated after the start of rotation of the motor 10 by the inter-slit angle θc.

Figure 6:
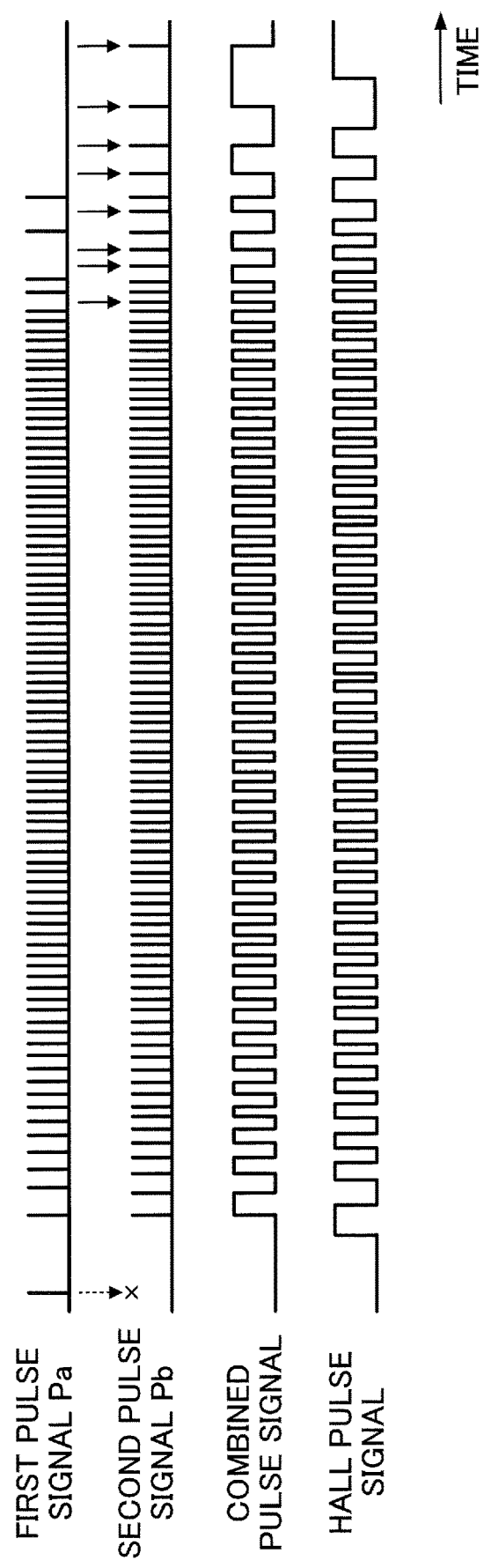
FIG. 6 is a drawing illustrating transitions of a combined pulse signal and a Hall pulse signal.

Next, results of an experiment regarding the reliability of the rotation amounts of the motor 10 calculated by the rotation angle detector 100 are described with reference to FIG. 6. FIG. 6 is a drawing illustrating transitions of a combined pulse signal and a Hall pulse signal.

The combined pulse signal is obtained by combining multiple pulses of the second pulse signals Pb into one pulse. In the example of FIG. 6, the inter-slit angle θc is 90 degrees. The first pulse signal Pa and the second pulse signal Pb are basically generated each time the rotation shaft of the motor 10 rotates 90 degrees. The combined pulse signal is obtained by combining two pulses of the second pulse signals Pb into one pulse. That is, the rotation angle detector 100 is configured to generate one combined pulse signal each time the rotation shaft of the motor 10 rotates 180 degrees.

The Hall pulse signal is a pulse signal output by a Hall sensor. The hall sensor detects a magnetic flux generated by a magnet attached to the rotation shaft of the motor 10 for comparison between the second pulse signal Pb and the hall pulse signal. In the example of FIG. 6, the rotation angle detector 100 is configured to generate one Hall pulse signal each time the rotation shaft of the motor 10 rotates 180 degrees.

In FIG. 6, a dotted arrow leading to "X" indicates that no second pulse signal Pb was generated based on the first pulse signal Pa. That is, the dotted arrow indicates that the first pulse signal Pa was ignored as noise. Each of eight solid arrows in FIG. 6 indicates that the second pulse signal Pb was generated when the generation of the first pulse signal Pa failed.

In the example of FIG. 6, the number of combined pulse signals generated during a time between the start of forward rotation of the motor 10 and the stop of the forward rotation is the same as the number of Hall pulse signals generated during the period. That is, the rotation amount of the motor 10 calculated based on the second pulse signals Pb is the same as the rotation amount of the motor 10 detected by the hall sensor.

Figure 7:
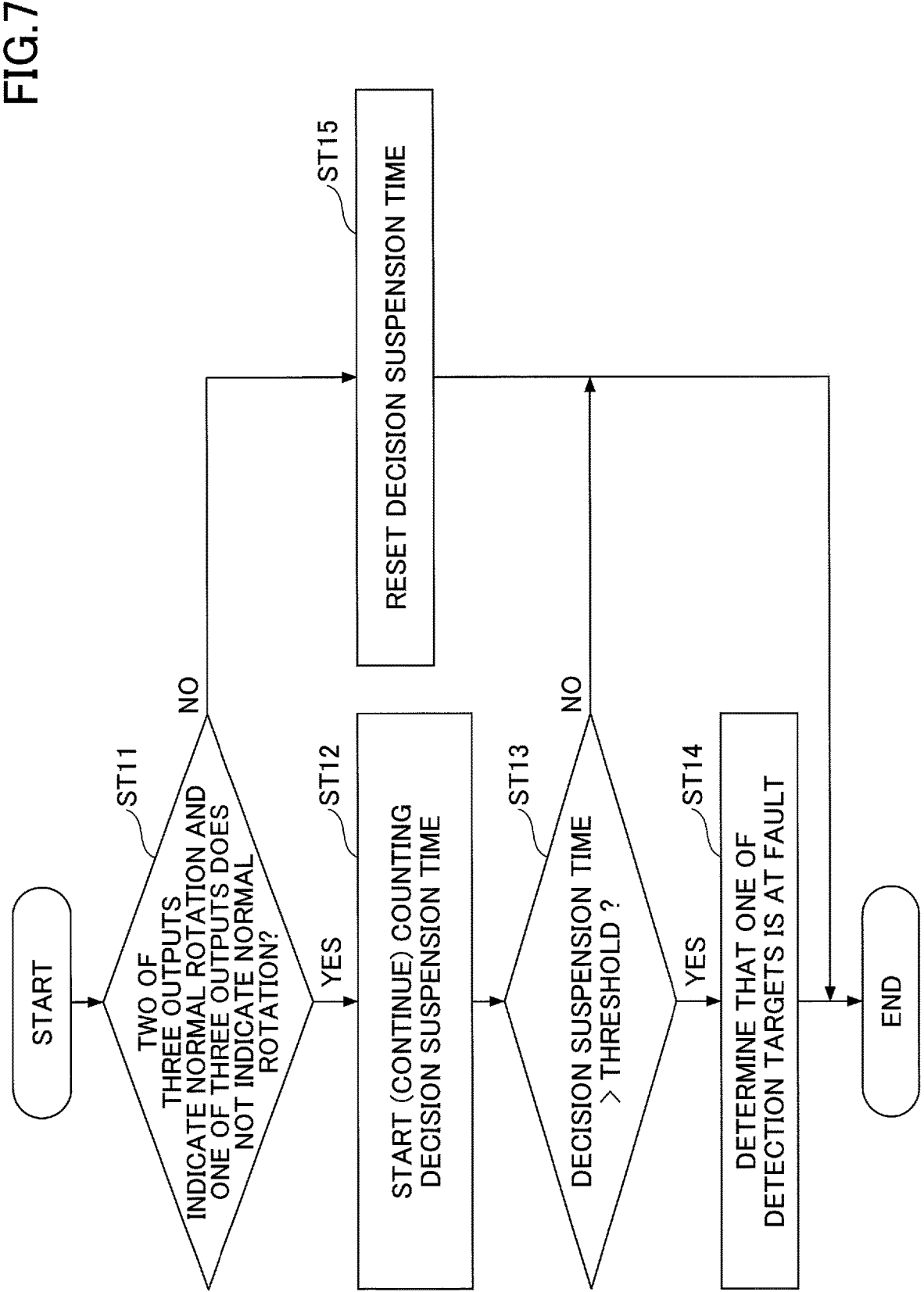
FIG. 7 is a flowchart illustrating a failure detection process.

Next, a process (hereafter referred to as a "failure detection process") performed by the failure detector 38 to detect a failure of a detection target is described with reference to FIG. 7. FIG. 7 is a flowchart illustrating a failure detection process. The failure detector 38 repeatedly performs the failure detection process at predetermined control periods.

First, the failure detector 38 determines whether outputs from two of three detection targets indicate normal rotation and an output from the remaining one of the three detection targets does not indicate normal rotation (Step ST11). That is, the failure detector 38 determines whether the three detection targets are in an abnormal state. In the present embodiment, the three detection targets are the voltage detector 10a, the current detector 10b, and the ripple detector RD.

The failure detector 38 determines that the inter-terminal voltage V output from the voltage detector 10a indicates normal rotation when, for example, the inter-terminal voltage V is greater than a predetermined minimum voltage (e.g., 7 V) and less than a predetermined maximum voltage (e.g., 18 V), i.e., within the first normal range; and determines that the inter-terminal voltage V does not indicate normal rotation when the inter-terminal voltage V is outside of the first normal range.

The failure detector 38 determines that the current Im output from the current detector 10b indicates normal rotation when, for example, the current Im is greater than a predetermined minimum current (e.g., 0.5 A) and less than a predetermined maximum current (e.g., 20 A), i.e., within the first normal range; and determines that the current Im does not indicate normal rotation when the current Im is outside of the first normal range. The maximum current may be the stall current.

The failure detector 38 determines that the first pulse signal Pa output from the ripple detector RD indicates normal rotation when, for example, the period T is greater than a predetermined minimum period and less than a predetermined maximum period, i.e., within the first normal range; and determines that the first pulse signal Pa does not indicate normal rotation when the period T is outside of the first normal range.

When it is determined that the three detection targets are in an abnormal state (YES at step ST11), the failure detector 38 starts counting the decision suspension time (step ST12). If the counting of the decision suspension time has already been started, the failure detector 38 continues the counting. In the present embodiment, the failure detector 38 causes the timer 38T to start or continue counting the decision suspension time.

Next, the failure detector 38 determines whether the decision suspension time has exceeded a threshold (step ST13). The threshold may vary depending on or may be the same regardless of which one of the three detection targets does not indicate normal rotation.

When it is determined that the decision suspension time has exceeded the threshold (YES at step ST13), the failure detector 38 determines that the remaining one of the detection targets whose output does not indicate normal rotation is at fault (step ST14). At this step, the failure detector 38 may output a failure detection signal to an external device.

When it is determined that the decision suspension time has not exceeded the threshold (NO at step ST13), the failure detector 38 ends the current failure detection process without determining that the remaining one of the detection targets is at fault. That is, the failure detector 38 suspends determining that the one of the detection targets is at fault until it is determined that the decision suspension time has exceeded the threshold. This is to prevent a false failure detection.

When it is determined that the three detection targets are not in the abnormal state (NO at step ST11), the failure detector 38 resets the decision suspension time (step ST15). In the present embodiment, the failure detector 38 resets the decision suspension time to zero and causes the timer 38T to stop counting the decision suspension time.

Also, when an abnormal state different from the previous abnormal state is detected, the failure detector 38 resets the decision suspension time to zero and causes the timer 38T to restart counting the decision suspension time. For example, even when a certain amount of time has already been counted after the first abnormal state is detected, if the first abnormal state is resolved and the second abnormal state is detected before the decision suspension time exceeds the threshold, the failure detector 38 resets the decision suspension time related to the first abnormal state to zero and causes the timer 38T to start counting the decision suspension time related to the second abnormal state.

As described above, the rotation angle detector 100 can determine that one of the voltage detector 10a, the current detector 10b, and the ripple detector RD is at fault when a state, where two of the voltage detector 10a, the current detector 10b, and the ripple detector RD indicate normal rotation and the one of the voltage detector 10a, the current detector 10b, and the ripple detector RD does not indicate normal rotation, continues for a predetermined period of time.

Figure 8:
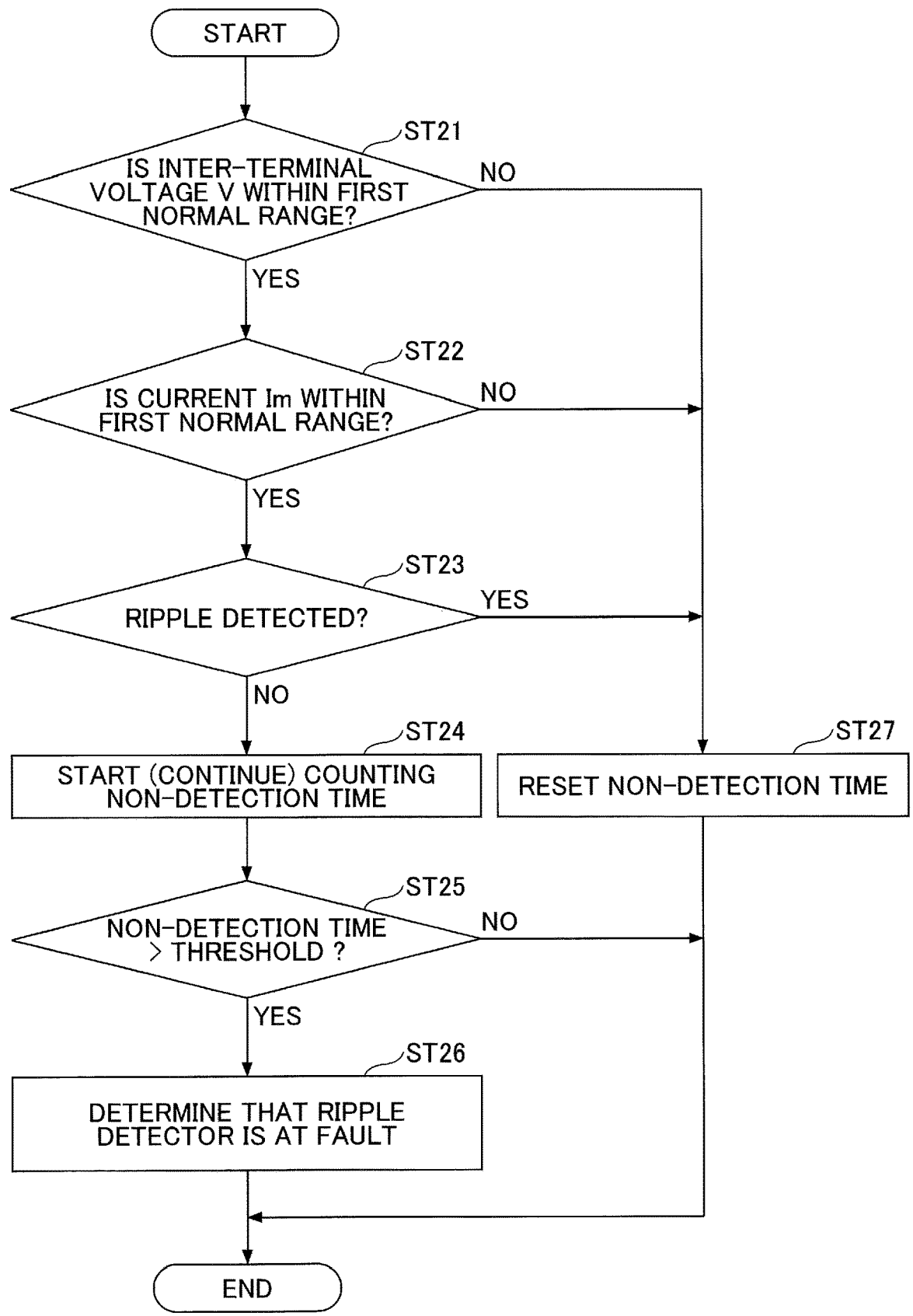
FIG. 8 is a flowchart illustrating a first failure detection process.

Next, a process (hereafter referred to as a "first failure detection process") performed by the failure detector 38 to detect the failure of the ripple detector RD is described with reference to FIG. 8. FIG. 8 is a flowchart illustrating a first failure detection process. The failure detector 38 repeatedly performs the first failure detection process at predetermined control periods.

First, the failure detector 38 determines whether the inter-terminal voltage V is within the first normal range (step ST21). When it is determined that the inter-terminal voltage V is within the first normal range (YES at step ST21), the failure detector 38 determines whether the current Im is within the first normal range (step ST22). When it is determined that the current Im is within the first normal range (YES at step ST22), the failure detector 38 determines whether a ripple component has been detected ("a ripple component has been detected" or "no ripple component has been detected") (step ST23).

When it is determined that no ripple component has been detected (NO at step ST23), i.e., when it is determined that the detectors are in the first abnormal state, the failure detector 38 starts counting a non-detection time (step ST24). The non-detection time is an example of the decision suspension time and indicates a time for which no ripple component is detected. If the counting of the non-detection time has already been started, the failure detector 38 continues the counting.

Next, the failure detector 38 determines whether the non-detection time has exceeded a threshold (step ST25). The threshold is preferably longer than the inertial rotation period. This is to prevent erroneously determining that the ripple detector RD is at fault based on detection of no ripple component during the inertial rotation.

When it is determined that the non-detection time has exceeded the threshold (YES at step ST25), the failure detector 38 determines that the ripple detector RD is at fault (step ST26). At this step, the failure detector 38 may output a failure detection signal indicating a failure of the ripple detector RD to an external device.

When it is determined that the non-detection time has not exceeded the threshold (NO at step ST25), the failure detector 38 ends the current first failure detection process without determining that the ripple detector RD is at fault. That is, the failure detector 38 suspends determining that the ripple detector RD is at fault until it is determined that the non-detection time has exceeded the threshold. This is to prevent a false failure detection.

When it is determined that the inter-terminal voltage V is not within the first normal range (NO at step ST21), when it is determined that the current Im is not within the first normal range (NO at step ST22), or when it is determined that a ripple component has been detected (YES at step ST23), the failure detector 38 resets the non-detection time (step ST27). In the present embodiment, the failure detector 38 resets the non-detection time to zero and stops counting the non-detection time. Here, three decision steps ST21 through ST23 may be performed in any order or may be performed simultaneously.

As described above, the failure detector 38 can determine that the ripple detector RD is at fault when the first pulse signal Pa is not detected for a predetermined period of time or more even though the rotation of the motor 10 is detectable based on the inter-terminal voltage V and the current Im.

Figure 9:
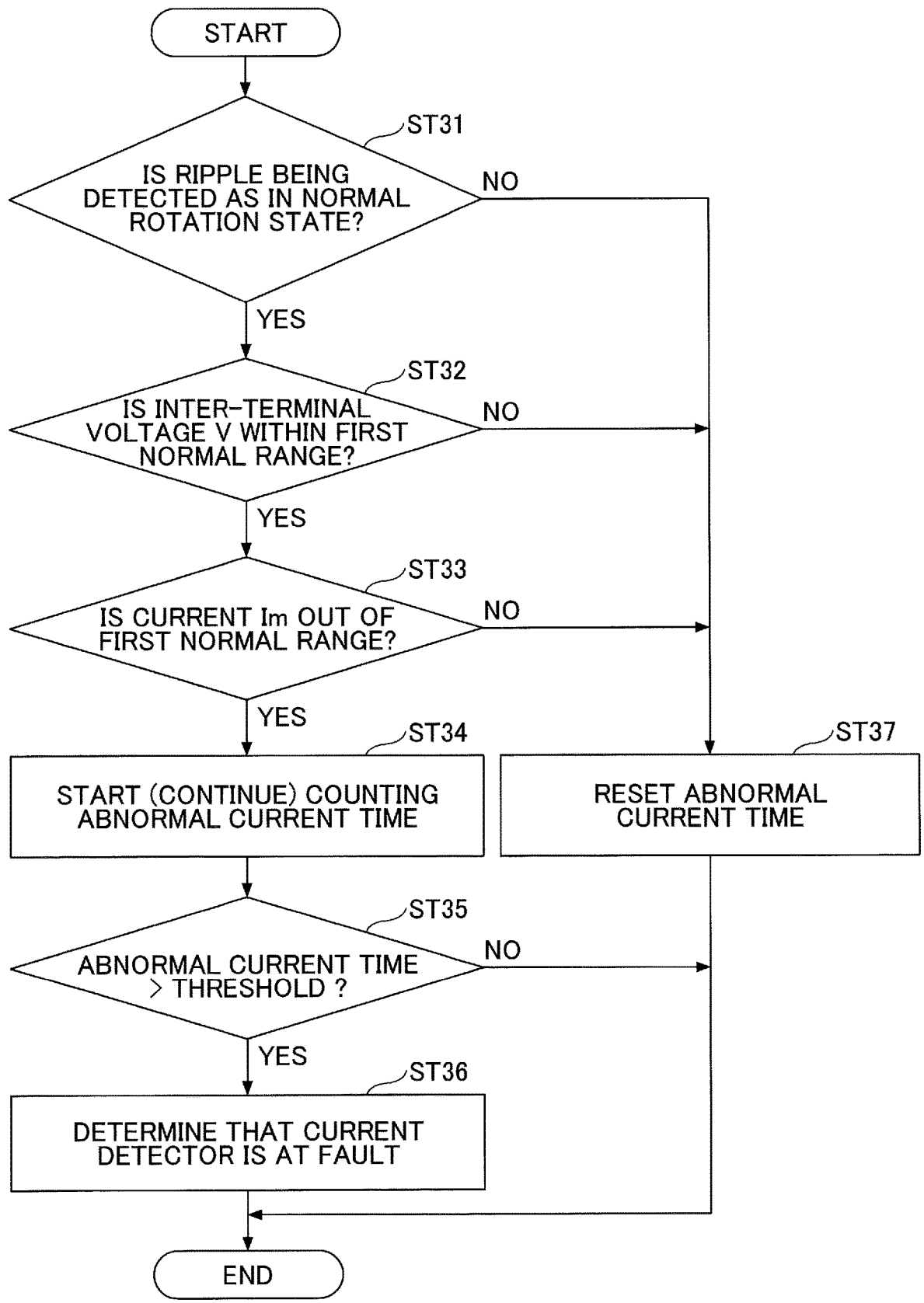
FIG. 9 is a flowchart illustrating a second failure detection process.

Next, a process (hereafter referred to as a "second failure detection process") performed by the failure detector 38 to detect the failure of the current detector 10b is described with reference to FIG. 9. FIG. 9 is a flowchart illustrating a second failure detection process. The failure detector 38 repeatedly performs the second failure detection process at predetermined control periods.

First, the failure detector 38 determines whether a ripple component is being detected as in the normal rotation state (step ST31). The state where a ripple component is being detected as in the normal rotation state indicates, for example, a state where the period T of the first pulse signal Pa output from the ripple detector RD is less than a predetermined value.

When it is determined that a ripple component is being detected as in the normal rotation state (YES at step ST31), the failure detector 38 determines whether the inter-terminal voltage V is within the first normal range (step ST32). When it is determined that the inter-terminal voltage V is within the first normal range (YES at step ST32), the failure detector 38 determines whether the current Im is outside of the first normal range (step ST33).

When it is determined that the current Im is outside of the first normal range (YES at step ST33), i.e., when it is determined that the detectors are in the second abnormal state, the failure detector 38 starts counting an abnormal current time (step ST34). The abnormal current time is an example of the decision suspension time and indicates a time for which the current Im is outside of the first normal range. If the counting of the abnormal current time has already been started, the failure detector 38 continues the counting.

Next, the failure detector 38 determines whether the abnormal current time has exceeded a threshold (step ST35). The threshold is preferably longer than the time that is necessary for the motor 10 to rotate once during the inertial rotation period. This is to prevent erroneously determining that the current detector 10b is at fault based on noise included in the current Im.

When it is determined that the abnormal current time has exceeded the threshold (YES at step ST35), the failure detector 38 determines that the current detector 10b is at fault (step ST36). At this step, the failure detector 38 may output a failure detection signal indicating a failure of the current detector 10b to an external device.

When it is determined that the abnormal current time has not exceeded the threshold (NO at step ST35), the failure detector 38 ends the current second failure detection process without determining that the current detector 10b is at fault. That is, the failure detector 38 suspends determining that the current detector 10b is at fault until it is determined that the abnormal current time has exceeded the threshold. This is to prevent a false failure detection.

When it is determined that a ripple component is not being detected as in the normal rotation state (NO at step ST31), when it is determined that the inter-terminal voltage V is not within the first normal range (NO at step ST32), or when it is determined that the current Im is within the first normal range (NO at step ST33), the failure detector 38 resets the abnormal current time (step ST37). In the present embodiment, the failure detector 38 resets the abnormal current time to zero and stops counting the abnormal current time. Here, three decision steps ST31 through ST33 may be performed in any order or may be performed simultaneously.

As described above, the failure detector 38 can determine that the current detector 10b is at fault when the rotation of the motor 10 is detectable based on a ripple component being detected as in the normal rotation state, the inter-terminal voltage V is within the first normal range, and the current Im is outside of the first normal range (for example, zero) for a predetermined period of time.

Figure 10:
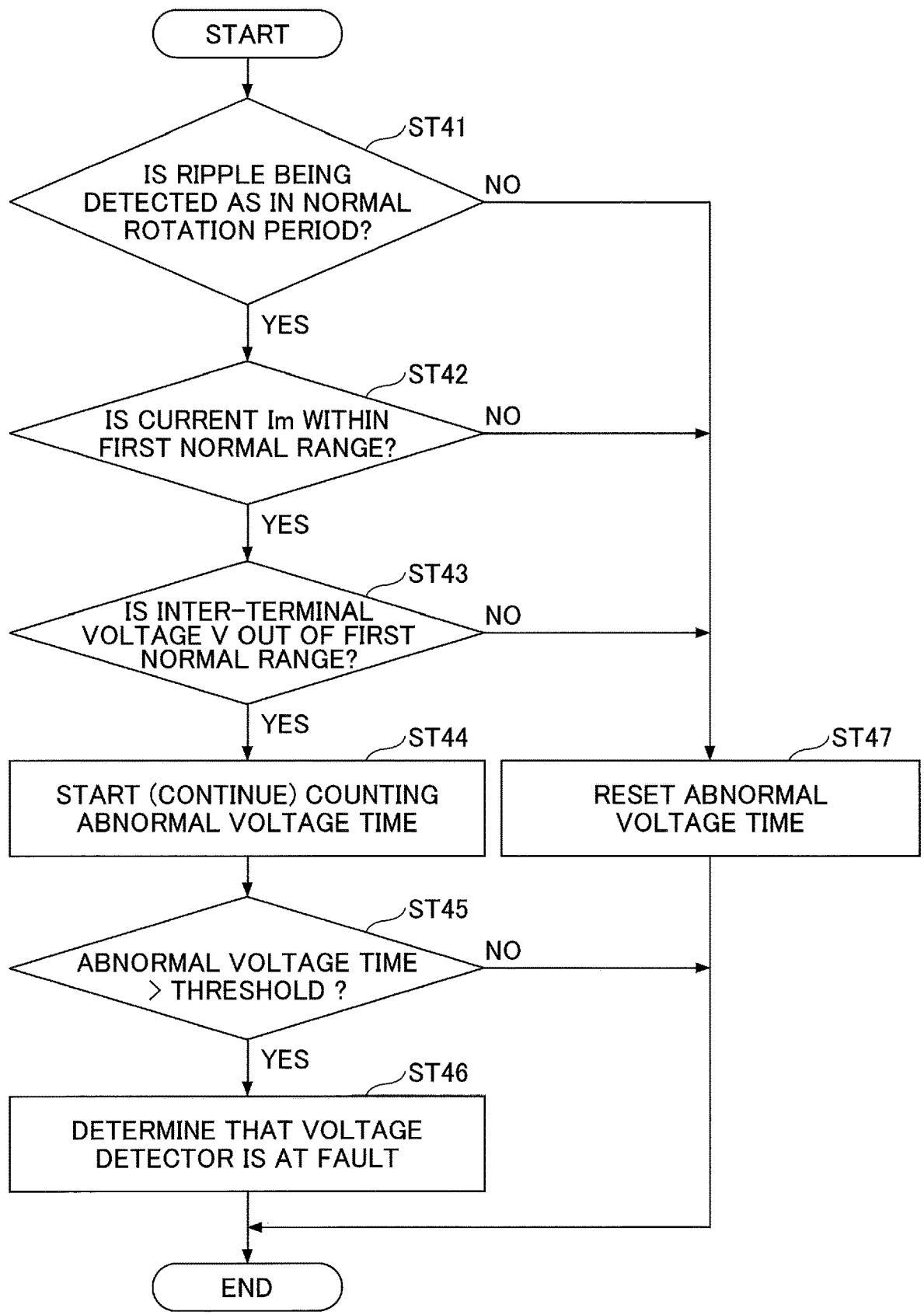
FIG. 10 is a flowchart illustrating a third failure detection process.

Next, a process (hereafter referred to as a "third failure detection process") performed by the failure detector 38 to detect the failure of the voltage detector 10a is described with reference to FIG. 10. FIG. 10 is a flowchart illustrating a third failure detection process. The failure detector 38 repeatedly performs the third failure detection process at predetermined control periods.

First, the failure detector 38 determines whether a ripple component is being detected as in the normal rotation state (step ST41). When it is determined that a ripple component is being detected as in the normal rotation state (YES at step ST41), the failure detector 38 determines whether the current IM is within the first normal range (step ST42). When it is determined that the current Im is within the first normal range (YES at step ST42), the failure detector 38 determines whether the inter-terminal voltage V is outside of the first normal range (step ST43).

When it is determined that the inter-terminal voltage V is outside of the first normal range (YES at step ST43), i.e., when it is determined that the detectors are in the third abnormal state, the failure detector 38 starts counting an abnormal voltage time (step ST44). The abnormal voltage time is an example of the decision suspension time and indicates a time for which the inter-terminal voltage V is outside of the first normal range. If the counting of the abnormal voltage time has already been started, the failure detector 38 continues the counting.

Next, the failure detector 38 determines whether the abnormal voltage time has exceeded a threshold (step ST45). The threshold is preferably longer than the time that is necessary for the motor 10 to rotate once during the inertial rotation period. This is to prevent erroneously determining that the voltage detector 10a is at fault based on noise included in the inter-terminal voltage V.

When it is determined that the abnormal voltage time has exceeded the threshold (YES at step ST45), the failure detector 38 determines that the voltage detector 10a is at fault (step ST46). At this step, the failure detector 38 may output a failure detection signal indicating a failure of the voltage detector 10a to an external device.

When it is determined that the abnormal voltage time has not exceeded the threshold (NO at step ST45), the failure detector 38 ends the current third failure detection process without determining that the voltage detector 10a is at fault. That is, the failure detector 38 suspends determining that the voltage detector 10a is at fault until it is determined that the abnormal voltage time has exceeded the threshold. This is to prevent a false failure detection.

When it is determined that a ripple component is not being detected as in the normal rotation state (NO at step ST41), when it is determined that the current Im is not within the first normal range (NO at step ST42), or when it is determined that the inter-terminal voltage V is within the first normal range (NO at step ST43), the failure detector 38 resets the abnormal voltage time (step ST47). In the present embodiment, the failure detector 38 resets the abnormal voltage time to zero and stops counting the abnormal voltage time. Here, three decision steps ST41 through ST43 may be performed in any order or may be performed simultaneously.

As described above, the failure detector 38 can determine that the voltage detector 10a is at fault when the rotation of the motor 10 is detectable based on a ripple component being detected as in the normal rotation state, the current Im is within the first normal range, and the inter-terminal voltage V is outside of the first normal range (for example, zero) for a predetermined period of time.

Figure 11:
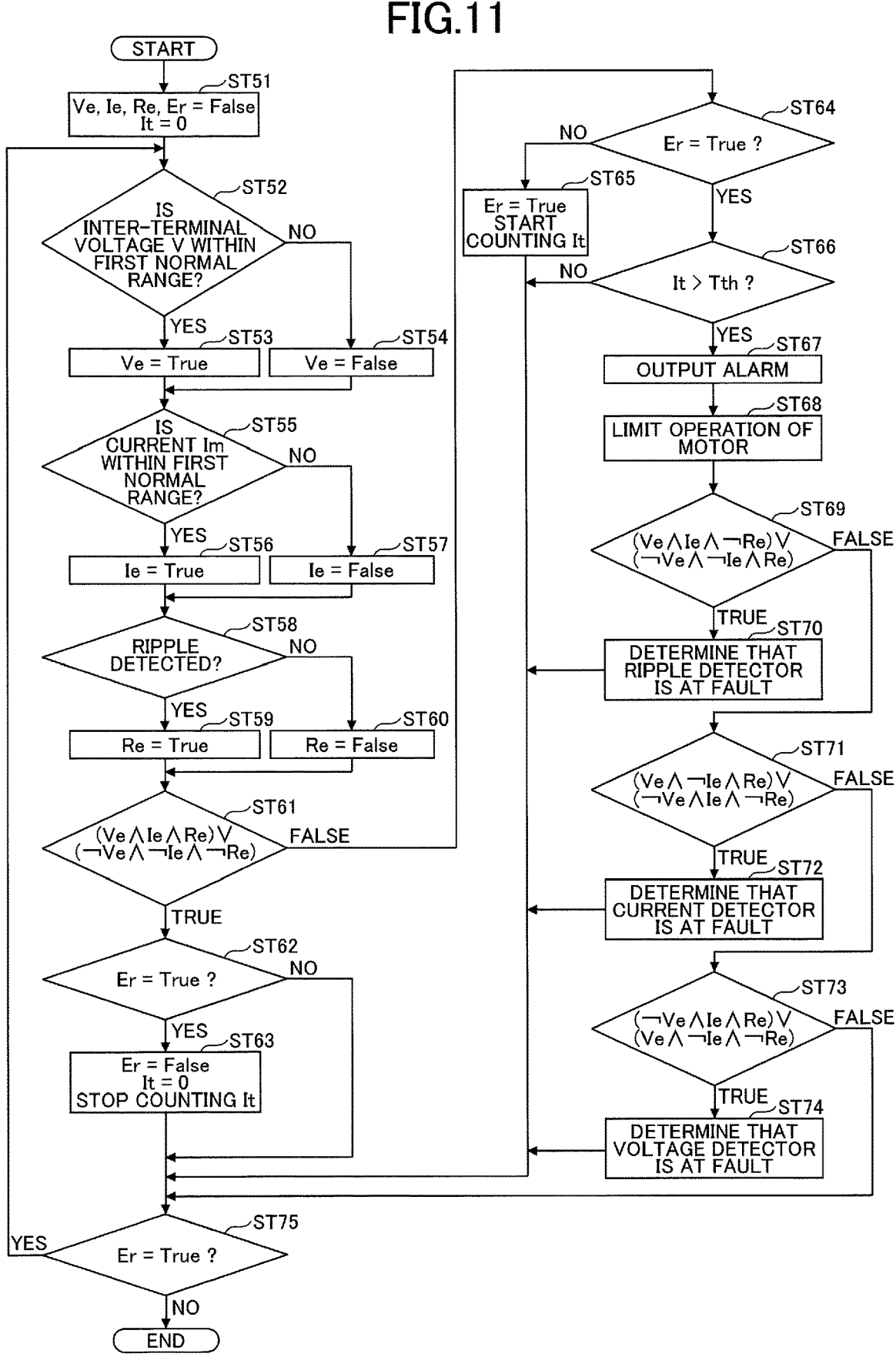
FIG. 11 is a flowchart illustrating a fourth failure detection process.

Next, a process (hereafter referred to as a "fourth failure detection process) in which the failure detector 38 detects a failure of any one of the voltage detector 10a, the current detector 10b, and the ripple detector RD using one algorithm is described with reference to FIG. 11. FIG. 11 is a flowchart illustrating a fourth failure detection process. The failure detector 38 performs the fourth failure detection process when, for example, the rotation angle detector 100 is powered on.

First, the failure detector 38 resets variables (step ST51). The variables include a voltage-related variable Ve, a current-related variable Ie, a ripple-related variable Re, a failure-related variable Er, and a failure duration variable It. The voltage-related variable Ve, the current-related variable Ie, the ripple-related variable Re, and the failure-related variable Er are Boolean variables. The voltage-related variable Ve indicates whether an output from the voltage detector 10a indicates normal rotation. The voltage-related variable Ve set to True means that the output from the voltage detector 10a indicates normal rotation. The voltage-related variable Ve set to False means that the output from the voltage detector 10a does not indicate normal rotation. In this example, True corresponds to a Boolean value "1", and False corresponds to a Boolean value "0". The current-related variable Ie indicates whether an output from the current detector 10b indicates normal rotation. The current-related variable Ie set to True means that the output from the current detector 10b indicates normal rotation. The current-related variable Ie set to False means that the output from the current detector 10b does not indicate normal rotation. The ripple-related variable Re indicates whether an output from the ripple detector RD indicates normal rotation. The ripple-related variable Re set to True means that the output from the ripple detector RD indicates normal rotation. The ripple-related variable Re set to False means that the output from the ripple detector RD does not indicate normal rotation. At step ST51, the failure detector 38 sets each of the voltage-related variable Ve, the current-related variable Ie, the ripple-related variable Re, and the failure-related variable Er to False.

The failure duration variable It is an integer variable. The failure duration variable It indicates a time for which a failure continues. At step ST51, the failure detector 38 sets the failure duration variable It to 0.

The failure detector 38 determines whether the inter-terminal voltage V is within the first normal range (step ST52). When the inter-terminal voltage V is within the first normal range, the failure detector 38 sets the voltage-related variable Ve to True (step ST53). When the inter-terminal voltage V is outside of the first normal range, the failure detector 38 sets the voltage-related variable Ve to False (step ST54).

The failure detector 38 determines whether the current Im is within the first normal range (step ST55). When the current Im is within the first normal range, the failure detector 38 sets the current-related variable Ie to True (step ST56). When the current Im is outside of the first normal range, the failure detector 38 sets the current-related variable Ie to False (step ST57).

The failure detector 38 determines whether a ripple component has been detected ("a ripple component has been detected" or "no ripple component has been detected") (step ST58). When a ripple component has been detected, the failure detector 38 sets the ripple-related variable Re to True (step ST59). When a ripple component has not been detected, the failure detector 38 sets the ripple-related variable Re to False (step ST60). Here, three decision steps ST52, ST55, and ST58 may be performed in any order or may be performed simultaneously.

Then, the failure detector 38 performs a logical operation based on the voltage-related variable Ve, the current-related variable Ie, and the ripple-related variable Re to determine whether there is a failure. Specifically, the failure detector 38 determines that there is no failure when the values of the voltage-related variable Ve, the current-related variable Ie, and the ripple-related variable Re are the same (True at step ST61). That is, the failure detector 38 determines that there is no failure when the value of a logical calculation result Rt1 (Rt1=(Ve$\wedge$Ie$\wedge$Re)$\vee$($\neg$Ve$\wedge$$\neg$Ie$\vee$$\neg$Re) is True. The logical calculation result Rt1 (Rt1=(Ve$\wedge$Ie$\wedge$Re)$\vee$($\neg$Ve$\wedge$$\neg$Ie$\wedge$$\neg$Re) becomes Ture when all of the voltage-related variable Ve, the current-related variable Ie, and the ripple-related variable Re are True or when all of the voltage-related variable Ve, the current-related variable Ie, and the ripple-related variable Re are False. On the other hand, the failure detector 38 determines that there is a possibility of a failure when the values of the voltage-related variable Ve, the current-related variable Ie, and the ripple-related variable Re are not the same (False at step ST61). That is, the failure detector 38 determines that there is a possibility of a failure when two of the voltage-related variable Ve, the current-related variable Ie, and the ripple-related variable Re are True and the remaining one of the voltage-related variable Ve, the current-related variable Ie, and the ripple-related variable Re is False or when two of the voltage-related variable Ve, the current-related variable Ie, and the ripple-related variable Re are False and the remaining one of the voltage-related variable Ve, the current-related variable Ie, and the ripple-related variable Re is True.

When it is determined that there is no failure (True at step ST61), the failure detector 38 refers to the value of the failure-related variable Er (step ST62). When the failure-related variable Er is True (YES at step ST62), the failure detector 38 sets the failure-related variable Er to False, sets the failure duration variable It to 0, and stops counting the failure duration variable It (step ST63).

When it is determined that there is a possibility of a failure (False at step ST61), the failure detector 38 refers to the value of the failure-related variable Er (step ST64). When the failure-related variable Er is False (NO at step ST64), the failure detector 38 sets the failure-related variable Er to True, and starts counting the failure duration variable It (step ST65).

When the failure-related variable Er is True (YES at step ST64), the failure detector 38 determines whether the failure duration variable It has exceeded a threshold Tth (step ST66).

When the failure duration variable It has exceeded the threshold Tth (YES at step ST66), the failure detector 38 determines that at least one of the voltage detector 10a, the current detector 10b, and the ripple detector RD is at fault, outputs an alarm (step ST67), and limits the operation of the motor 10 (step ST68). For example, the failure detector 38 may output an alarm indicating that at least one of the voltage detector 10a, the current detector 10b, and the ripple detector RD is at fault. The alarm may be a visual alarm and/or an audio alarm. With this configuration, the failure detector 38 can output an alarm before determining which one of the voltage detector 10a, the current detector 10b, and the ripple detector RD is at fault.

Also, when, for example, the motor 10 is used to move a vehicle window up and down, the failure detector 38 may be configured to disable an automatic full-opening function and an automatic full-closing function upon detecting a failure. The automatic full-opening function fully opens the window automatically when, for example, an open button on a door is pressed with a relatively strong force. With the automatic full-opening function, even if a finger pressing the open button is moved away from the open button, the window-opening operation continues until the window is fully opened. The automatic full-closing function fully closes the window automatically when, for example, a close button on a door is pressed with a relatively strong force. With the automatic full-closing function, even if a finger pressing the close button is moved away from the close button, the window-closing operation continues until the window is fully closed.

The failure detector 38 disables the automatic full-opening function and the automatic full-closing function when a failure is detected. This is because the rotation angle detector 100 cannot accurately calculate the amount of rotation of the motor 10, cannot determine whether the window is fully closed or fully open, and cannot determine whether an object such as a finger is caught in the window. However, the failure detector 38 may allow the window closing and opening operations to continue when the motor 10 is manually controlled. This is because the operator can visually determine whether the window is fully closed or fully open and whether an object such as a finger is caught in the window even when the rotation angle detector 100 is at fault. That is, as long as the window is manually operated, the situation where the amount of rotation of the motor 10 cannot be accurately calculated does not pose a problem in opening and closing the window.

Specifically, even if a failure is detected, the failure detector 38 may allow the window opening operation to continue when the open button is continuously pressed with a relatively weak force, i.e., when a normal opening function is used instead of the automatic full-opening function. Similarly, even if a failure is detected, the failure detector 38 may allow the window closing operation to continue when the close button is continuously pressed with a relatively weak force, i.e., when a normal closing function is used instead of the automatic full-closing function. Also, when a failure is detected, the failure detector 38 may stop the opening operation if the finger is moved away from the open button after the automatic full-opening function is started, but allow the opening operation to continue if the open button is continuously pressed even after the automatic full-opening function is started. The same applies to the automatic full-closing function.

Thus, when the motor 10 is used for moving a vehicle window up and down, the failure detector 38 may be configured to allow the motor 10 to operate only when the motor 10 is manually controlled.

After step ST68, the failure detector 38 determines whether the ripple detector RD is at fault (step ST69). When the voltage-related variable Ve matches the current-related variable Ie and these two variables differ from the ripple-related variable Re (True at step ST69), the failure detector 38 determines that the ripple detector RD is at fault (step ST70). That is, the failure detector 38 determines that the ripple detector RD is at fault (step ST70) when the value of a logical calculation result $Rt2$ ($Rt2=(Ve \land Ie \land \neg Re) \lor (\neg Ve \land \neg Ie \land Re)$) is True (True at step ST69).

When it is determined that the ripple detector RD is not at fault (False at step ST69), the failure detector 38 determines whether the current detector 10b is at fault (step ST71). When the voltage-related variable Ve matches the ripple-related variable Re and these two variables differ from the current-related variable Ie (Ture at step ST71), the failure detector 38 determines that the current detector 10b is at fault (step ST72). That is, the failure detector 38 determines that the current detector 10b is at fault (step ST72) when the value of a logical calculation result $Rt3$ ($Rt3=(Ve \land \neg Ie \land Re) \lor (\neg Ve \land Ie \land \neg Re)$) is True (True at step ST71).

When it is determined that the current detector 10b is not at fault (False at step ST71), the failure detector 38 determines whether the voltage detector 10a is at fault (Step ST73). When the current-related variable Ie matches the ripple-related variable Re and these two variables differ from the voltage-related variable Ve (YES at step ST73), the failure detector 38 determines that the voltage detector 10a is at fault (step ST74). That is, the failure detector 38 determines that the voltage detector 10a is at fault (step ST74) when the value of a logical calculation result $Rt4$ ($Rt4=(\neg Ve \land Ie \land Re) \lor (Ve \land \neg Ie \land \neg Re)$) is True (True at step ST73). Here, three decision steps ST69, ST71, and ST73 may be performed in any order or may be performed simultaneously.

When the failure detection steps are completed, the failure detector 38 determines whether monitoring needs to be continued (step ST75). In the example of FIG. 11, the failure detector 38 refers to the value of the failure-related variable Er. When the failure-related variable Er is True (YES at step ST75), the failure detector 38 repeats step ST52 and subsequent steps. When the failure-related variable Er is False (NO at step ST75), the failure detector 38 ends the fourth failure detection process.

Figure 12:
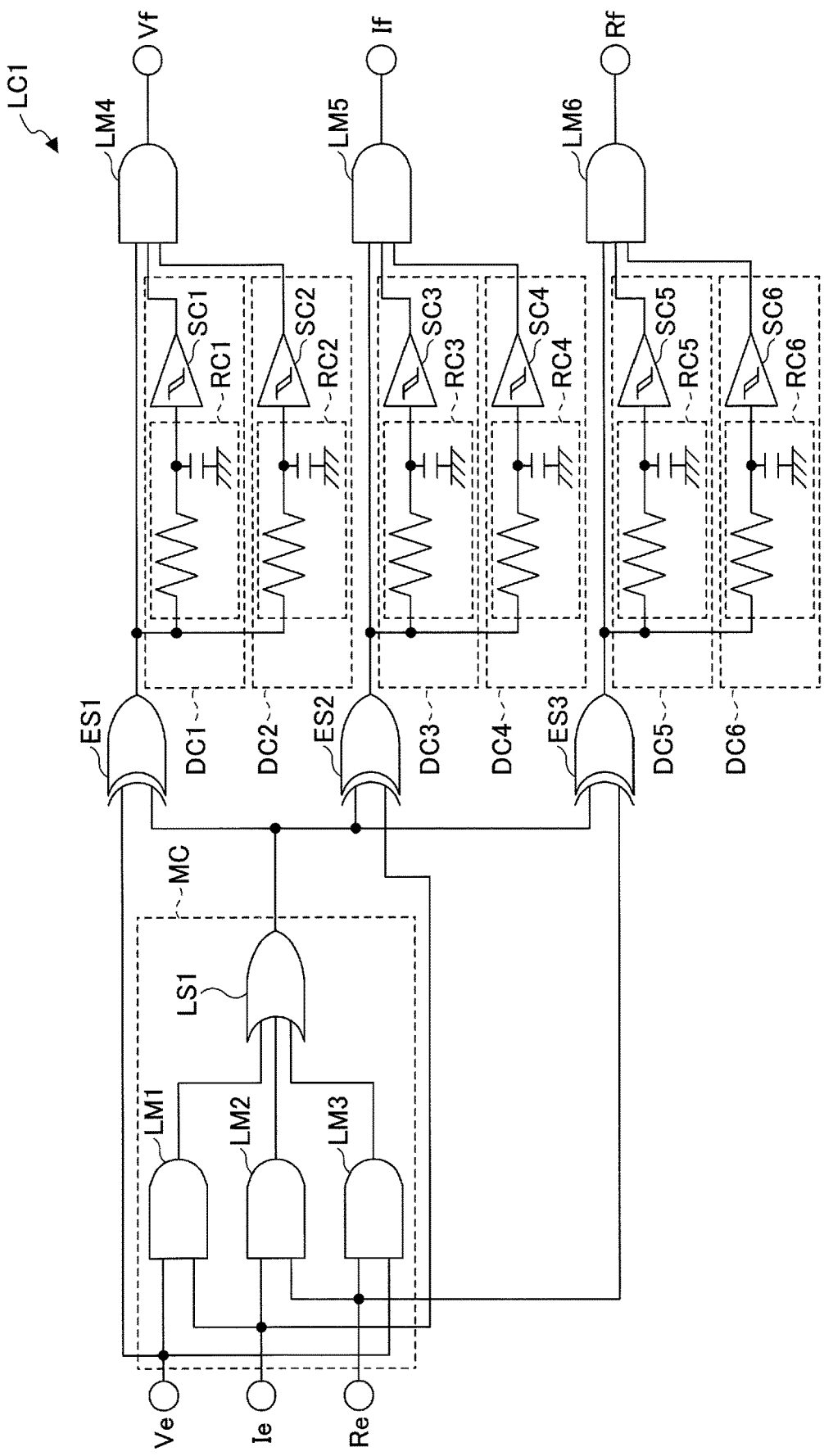
FIG. 12 is a drawing illustrating a configuration of a logic circuit for implementing the fourth failure detection process.

Next, a logic circuit LC1 for implementing the fourth failure detection process is described with reference to FIG. 12. FIG. 12 is a drawing illustrating a configuration of the logic circuit LC1.

The logic circuit LC1 includes a majority circuit MC, exclusive-OR circuits ES1 through ES3, delay circuits DC1 through DC6, and AND circuits LM4 through LM6.

The majority circuit MC is a logic circuit having three inputs and one output, and is configured to output "True" when the values of two or more inputs are True. In the example of FIG. 12, the majority circuit MC includes three AND circuits LM1 through LM3 and one OR circuit LS1. Values of the voltage-related variable Ve, the current-related variable Ie, and the ripple-related variable Re are input to the three inputs. In this case, when two or more of the voltage-related variable Ve, the current-related variable Ie, and the ripple-related variable Re are True, the majority circuit MC outputs "True". On the other hand, when two or more of the voltage-related variable Ve, the current-related variable Ie, and the ripple-related variable Re are False, the majority circuit MC outputs "False".

Each of the exclusive-OR circuits ES1 through ES3 is a logic circuit having two inputs and one output, and is configured to output "True" only when one of the two inputs is True and the other one of the two inputs is False.

The two inputs of the exclusive-OR circuit ES1 receive the value of the voltage-related variable Ve and an output from the majority circuit MC. The two inputs of the exclusive-OR circuit ES2 receive the value of the current-related variable Ie and an output from the majority circuit MC. The two inputs of the exclusive-OR circuit ES3 receive the value of the ripple-related variable Re and an output from the majority circuit MC.

Each of the delay circuits DC1 through DC6 is a logic circuit having one input and one output, and is configured to delay an input signal and output the delayed input signal. In the example of FIG. 12, the delay circuit DC1 includes an RC delay circuit RC1 and a Schmitt trigger circuit SC1 and delays an output from the exclusive-OR circuit ES1 for a predetermined time PT1. The delay circuit DC2 includes an RC delay circuit RC2 and a Schmitt trigger circuit SC2 and delays an output from the exclusive-OR circuit ES1 for a predetermined time PT2 that is longer than the predetermined time PT1. The predetermined time PT1 is adjusted by adjusting the time constant of the RC delay circuit RC1. The predetermined time PT2 is adjusted by adjusting the time constant of the RC delay circuit RC2. Similarly, the delay circuit DC3 includes an RC delay circuit RC3 and a Schmitt trigger circuit SC3 and delays an output from the exclusive-OR circuit ES2 for the predetermined time PT1. The delay circuit DC4 includes an RC delay circuit RC4 and a Schmitt trigger circuit SC4 and delays an output from the exclusive-OR circuit ES2 for the predetermined time PT2. The delay circuit DC5 includes an RC delay circuit RC5 and a Schmitt trigger circuit SC5 and delays an output from the exclusive-OR circuit ES3 for the predetermined time PT1. The delay circuit DC6 includes an RC delay circuit RC6 and a Schmitt trigger circuit SC6 and delays an output from the exclusive-OR circuit ES3 for the predetermined time PT2.

Each of the AND circuits LM4 through LM6 is a logic circuit having three inputs and one output, and is configured to output "True" only when all of the three inputs are True.

The three inputs of the AND circuit LM4 receive an output from the exclusive-OR circuit ES1, an output from the delay circuit DC1, and an output from the delay circuit DC2. The three inputs of the AND circuit LM5 receive an output from the exclusive-OR circuit ES2, an output from the delay circuit DC3, and an output from the delay circuit DC4. The three inputs of the AND circuit LM6 receive an output from the exclusive-OR circuit ES3, an output from the delay circuit DC5, and an output from the delay circuit DC6.

That is, the AND circuit LM4 outputs "True" when an output from the exclusive-OR circuit ES1 at a current time point, an output from the exclusive-OR circuit ES1 at a first time point in the past, and an output from the exclusive-OR circuit ES1 at a second time point before the first time point are all True. Similarly, the AND circuit LM5 outputs "True" when an output from the exclusive-OR circuit ES2 at a current time point, an output from the exclusive-OR circuit ES2 at a first time point in the past, and an output from the exclusive-OR circuit ES2 at a second time point before the first time point are all True. Also, the AND circuit LM6 outputs "True" when an output from the exclusive-OR circuit ES3 at a current time point, an output from the exclusive-OR circuit ES3 at a first time point in the past, and an output from the exclusive-OR circuit ES3 at a second time point before the first time point are all True.

Typically, the AND circuit LM4 outputs "True" when a state where the voltage-related variable Ve is False and the current-related variable Ie and the ripple-related variable Re are True continues from the second time point to the current time point. The AND circuit LM5 outputs "True" when a state where the current-related variable Ie is False and the voltage-related variable Ve and the ripple-related variable Re are True continues from the second time point to the current time point. The AND circuit LM6 outputs "True" when a state where the ripple-related variable Re is False and the voltage-related variable Ve and the current-related variable Ie are True continues from the second time point to the current time point.

The failure detector 38 determines that the voltage detector 10a is at fault when a logical calculation result Vf, which is an output from the AND circuit LM4, is True; determines that the current detector 10b is at fault when a logical calculation result If, which is an output from the AND circuit LM5, is True; and determines that the ripple detector RD is at fault when a logical calculation result Rf, which is an output from the AND circuit LM6, is True.

With the logic circuit LC1 illustrated in FIG. 12, the failure detector 38 can determine that at least one of the voltage detector 10a, the current detector 10b, and the ripple detector RD is at fault when a state, where outputs from two of the voltage detector 10a, the current detector 10b, and the ripple detector RD indicate normal rotation and an output from the remaining one of the voltage detector 10a, the current detector 10b, and the ripple detector RD does not indicate normal rotation, continues for a predetermined period of time. Also, the failure detector 38 can determine that at least one of the voltage detector 10a, the current detector 10b, and the ripple detector RD is at fault when a state, where outputs from two of the voltage detector 10a, the current detector 10b, and the ripple detector RD do not indicate normal rotation and an output from the remaining one of the voltage detector 10a, the current detector 10b, and the ripple detector RD indicates normal rotation, continues for a predetermined period of time.

In the example of FIG. 12, the AND circuit LM4 is configured to perform an AND operation on the outputs from the exclusive-OR circuit ES1 at three time points including the current time point and the two past time points. Alternatively, the AND circuit LM4 may be configured to perform an AND operation on outputs from the exclusive-OR circuit ES1 at four or more time points. The same applies to the AND circuit LM5 and the AND circuit LM6.

Figure 13:
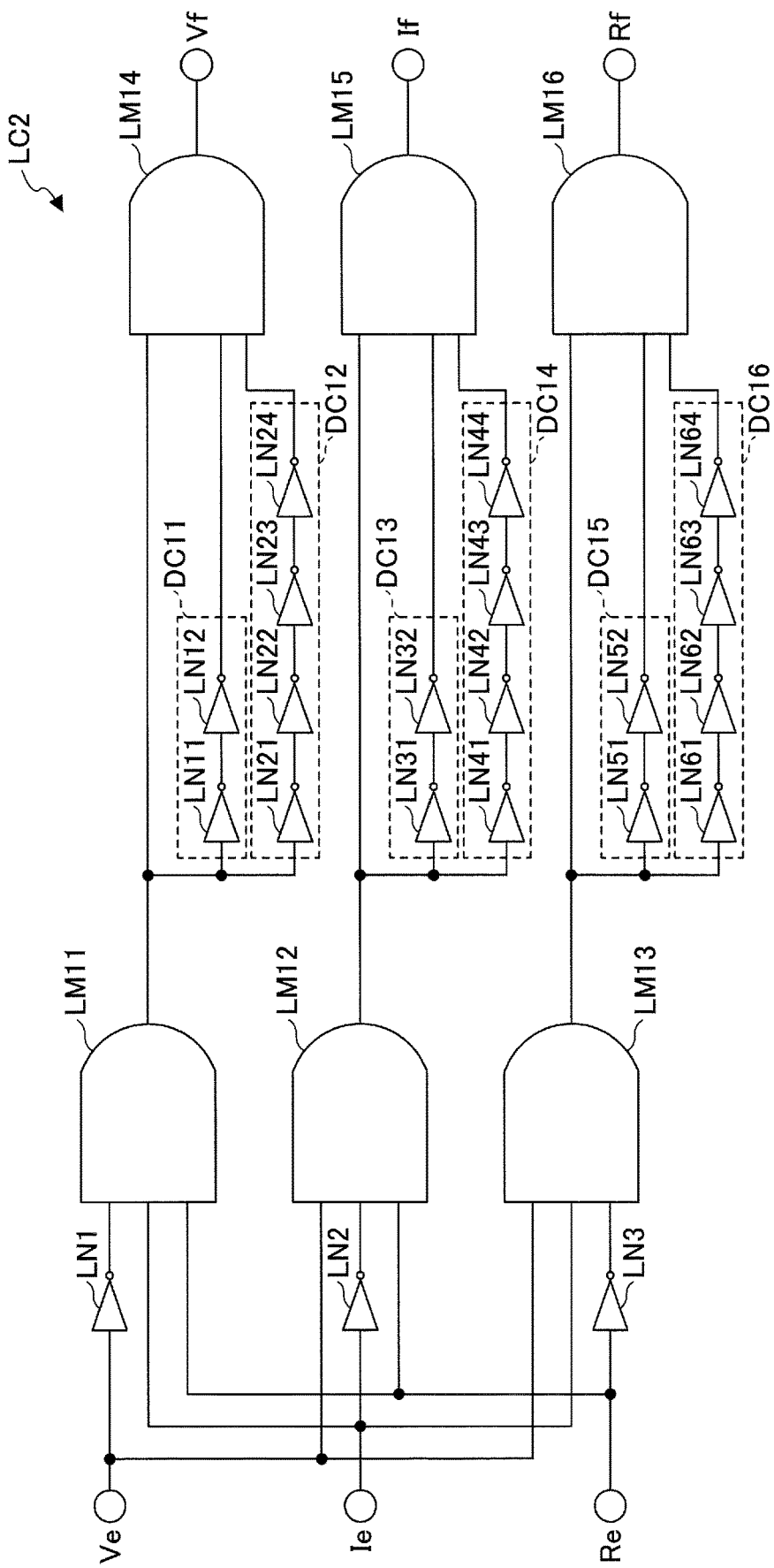
FIG. 13 is a drawing illustrating a configuration of a logic circuit for implementing the failure detection process.

Next, a logic circuit LC2 for implementing the failure detection processes illustrated in FIGS. 7 through 10 is described with reference to FIG. 13. FIG. 13 is a drawing illustrating a configuration of the logic circuit LC2.

The logic circuit LC2 includes NOT circuits LN1 through LN3, AND circuits LM11 through LM13, gate delay circuits DC11 through DC16, and AND circuits LM14 through LM16.

Each of the NOT circuits LN1 through LN3 is a logic circuit having one input and one output, and is configured to output "False" when "True" is input and output "True" when "False" is input.

The NOT circuit LN1 receives the value of the voltage-related variable Ve, the NOT circuit LN2 receives the value of the current-related variable Ie, and the NOT circuit LN3 receives the value of the ripple-related variable Re.

Each of the AND circuits LM11 through LM13 is a logic circuit having three inputs and one output, and is configured to output "True" only when all of the three inputs are True.

The three inputs of the AND circuit LM11 receive an output from the NOT circuit LN1, the current-related variable Ie, and the ripple-related variable Re. The three inputs of the AND circuit LM12 receive the voltage-related variable Ve, an output from the NOT circuit LN2, and the ripple-related variable Re. The three inputs of the AND circuit LM13 receive the voltage-related variable Ve, the current-related variable Ie, and an output from the NOT circuit LN3.

Each of the gate delay circuits DC11 through DC16 is a logic circuit having one input and one output, and is configured to delay an input signal and output the delayed input signal. In the example of FIG. 13, the gate delay circuit DC11 includes two NOT circuits LN11 and LN12 and delays the output from the AND circuit LM11 for a predetermined time PT1. The gate delay circuit DC12 includes four NOT circuits LN21 through LN24 and delays the output from the AND circuit LM11 for a predetermined time PT2 that is longer than the predetermined time PT1. Each of the gate delay circuits DC11 and DC12 is composed of an even number of NOT circuits so that the output becomes the same as the input. The predetermined time PT1 and the predetermined time PT2 can be adjusted by adjusting the number of NOT circuits.

Similarly, the gate delay circuit DC13 includes two NOT circuits LN31 and LN32 and delays the output from the AND circuit LM12 for the predetermined time PT1. The gate delay circuit DC14 includes four NOT circuits LN41 through LN44 and delays the output from the AND circuit LM12 for the predetermined time PT2. The gate delay circuit DC15 includes two NOT circuits LN51 and LN52 and delays the output from the AND circuit LM13 for the predetermined time PT1. The gate delay circuit DC16 includes four NOT circuits LN61 through LN64 and delays the output from the AND circuit LM13 for the predetermined time PT2.

Each of the AND circuits LM14 through LM16 is a logic circuit having three inputs and one output, and is configured to output "True" only when all of the three inputs are True.

The three inputs of the AND circuit LM14 receive an output from the AND circuit LM11, an output from the gate delay circuit DC11, and an output from the gate delay circuit DC12. The three inputs of the AND circuit LM15 receive an output from the AND circuit LM12, an output from the gate delay circuit DC13, and an output from the gate delay circuit DC14. The three inputs of the AND circuit LM16 receive an output from the AND circuit LM13, an output from the gate delay circuit DC15, and an output from the gate delay circuit DC16.

That is, the AND circuit LM14 outputs "True" when an output from the AND circuit LM11 at a current time point, an output from the AND circuit LM11 at a first time point in the past, and an output from the AND circuit LM11 at a second time point before the first time point are all True. Similarly, the AND circuit LM15 outputs "True" when an output from the AND circuit LM12 at the current time point, an output from the AND circuit LM12 at the first time point in the past, and an output from the AND circuit LM12 at the second time point in the past are all True. Also, the AND circuit LM16 outputs "True" when an output from the AND circuit LM13 at the current time point, an output from the AND circuit LM13 at the first time point in the past, and an output from the AND circuit LM13 at the second time point in the past are all True.

Typically, the AND circuit LM14 outputs "True" when a state where the voltage-related variable Ve is False and the current-related variable Ie and the ripple-related variable Re are True continues from the second time point to the current time point. The AND circuit LM15 outputs "True" when a state where the current-related variable Ie is False and the voltage-related variable Ve and the ripple-related variable Re are True continues from the second time point to the current time point. The AND circuit LM16 outputs "True" when a state where the ripple-related variable Re is False and the voltage-related variable Ve and the current-related variable Ie are True continues from the second time point to the current time point.

The failure detector 38 determines that the voltage detector 10a is at fault when a logical calculation result Vf, which is an output from the AND circuit LM14, is True; determines that the current detector 10b is at fault when a logical calculation result If, which is an output from the AND circuit LM15, is True; and determines that the ripple detector RD is at fault when a logical calculation result Rf, which is an output from the AND circuit LM16, is True.

With the logic circuit LC2 illustrated in FIG. 13, the failure detector 38 can determine that at least one of the voltage detector 10a, the current detector 10b, and the ripple detector RD is at fault when a state, where outputs from two of the voltage detector 10a, the current detector 10b, and the ripple detector RD indicate normal rotation and an output from the remaining one of the voltage detector 10a, the current detector 10b, and the ripple detector RD does not indicate normal rotation, continues for a predetermined period of time.

In the example of FIG. 13, the AND circuit LM14 is configured to perform an AND operation on the outputs from the AND circuit LM11 at three time points including the current time point and the two past time points. Alternatively, the AND circuit LM14 may be configured to perform an AND operation on outputs from the AND circuit LM11 at four or more time points. The same applies to the AND circuit LM15 and the AND circuit LM16.

Also, delay circuits other than the delay circuits DC1 through DC6 illustrated in FIG. 12 and the gate delay circuits DC11 through DC16 illustrated in FIG. 13 may be used. For example, a delay line implemented by an inductor may be used as the delay circuit.

The rotation angle detector 100 may be implemented by hardware such as the logic circuit LC1 or the logic circuit LC2, by software including one or more programs, or by a combination of hardware and software.

As described above, the rotation angle detector 100 for obtaining information on the rotation of the motor 10 including the commutator 20 includes the rotational angular velocity calculator 31 that calculates the rotational angular velocity ω of the motor 10 based on a detection result of the voltage detector 10a for detecting the inter-terminal voltage V of the motor 10 and a detection result of the current detector 10b for detecting the current Im flowing through the motor 10, the ripple detector RD for detecting the ripple component Ir included in the current Im flowing through the motor 10, and the failure detector 38 for detecting a failure of each of the voltage detector 10a, the current detector 10b, and the ripple detector RD based on outputs from the voltage detector 10a, the current detector 10b, and the ripple detector RD. When a state, where outputs from two of the voltage detector 10a, the current detector 10b, and the ripple detector RD indicate normal rotation and an output from the remaining one of the voltage detector 10a, the current detector 10b, and the ripple detector RD does not indicate normal rotation, continues for a predetermined period of time, the failure detector 38 determines that the remaining one of the voltage detector 10a, the current detector 10b, and the ripple detector RD is at fault. Specifically, the rotation angle detector 100 can estimate the rotational state of the motor 10 based on each of the first pulse signal Pa generated based on the ripple component Ir of the current Im and the rotation angle θ calculated based on the inter-terminal voltage V and the current Im. That is, the rotation angle detector 100 can estimate the rotational state of the motor 10 based on each of the first pulse signal Pa and the rotation angle θ that are two parameters obtained by different methods. Therefore, when the rotational state estimated using a first parameter is substantially different from the rotational state estimated using a second parameter, the rotation angle detector 100 can determine that a detection target related to one of the first and second parameters is at fault. When two of three detection targets are determined to be normal, the rotation angle detector 100 can determine that the remaining one of the three detection targets is at fault. This configuration makes it possible to more reliably detect a failure of a detection target with no additional costs. The rotation angle detector 100 may be configured to detect a failure of each of (or any one of) three detection targets by determining whether outputs from two of the three detection targets are normal and an output from the remaining one of the three detection targets is abnormal, may be configured to detect failures of two of three detection targets, or may be configured to detect a failure of a specific one of three detection targets.

Here, the rotation angle detector 100 may be attached to the motor 10, and the motor 10 and the rotation angle detector 100 may be collectively referred to as a "motor module". In other words, a motor module includes the motor 10 and the rotation angle detector 100 that detects the rotation angle of the motor 10. The motor 10 includes the commutator 20 that includes multiple commutator segments 20a.

The rotation angle detector 100 may include a timer 38T for measuring the duration of a state where outputs from two of three detection targets, which include the voltage detector 10a, the current detector 10b, and the ripple detector RD, indicate normal rotation and an output from the remaining one of the detection targets does not indicate normal rotation. In this case, the failure detector 38 may be configured to determine that the remaining one of the detection targets is at fault when the duration measured by the timer 38T exceeds a predetermined period. This configuration makes it possible to more reliably prevent a false failure detection.

As described above, the rotation angle detector 100 obtains rotation information of the motor 10 including the commutator 20 and includes the rotation angle calculator 32 that calculates the rotation angle θ based on the inter-terminal voltage V and the current Im, the first signal generator 34 that generates the first pulse signal Pa based on the ripple component Ir included in the current Im, the second signal generator 35 that generates the second pulse signal Pb indicating that the motor 10 has rotated by a predetermined angle based on the first pulse signal Pa and the rotation angle θ, and the rotation information calculator 36 that calculates the rotation information based on outputs from the second signal generator 35. This in turn makes it possible to obtain highly-reliable rotation information of the motor 10 without using a rotation sensor such as a Hall sensor. This indicates that components such as a sensor interface circuit and a harness necessary to use a rotation sensor can be omitted. This in turn makes it possible to reduce the weight, the costs, and the size of the rotation angle detector 100.

The rotation angle detector 100 generates the second pulse signal Pb using the first pulse signal Pa generated based on the ripple component Ir of the current Im and the rotation angle θ calculated based on the inter-terminal voltage V and the current Im. That is, the rotation angle detector 100 generates the second pulse signal Pb based on the first pulse signal Pa and the rotation angle θ that are two parameters obtained by different methods. With this configuration, even when a first parameter of the parameters is not obtained properly, the rotation angle detector 100 can compensate for the first parameter by using a second parameter of the parameters. Accordingly, the rotation angle detector 100 can obtain more reliable rotation information of the motor 10.

The rotation angle calculator 32 is configured, for example, to calculate the rotation angle θ by integrating the rotational angular velocities ω of the motor 10 calculated based on the inter-terminal voltage V and the current Im. With this configuration, the rotation angle calculator 32 can stably and continuously calculate the rotation angle θ throughout the entire period including a period immediately after the motor 10 is started and an inertial rotation period. Also, the second signal generator 35 is configured to generate the second pulse signal Pb immediately after the rotation angle θ reaches a predetermined angle. Thus, the second signal generator 35 can generate, in real time, the second pulse signal Pb indicating that the motor 10 has rotated by a predetermined angle based on the stably and continuously calculated rotation angle θ even if a failure in generating the first pulse signal Pa occurs. Therefore, the rotation angle detector 100 can calculate the rotation information of the motor 10 without delay.

The second signal generator 35 is configured to output, to the rotation angle calculator 32, a command to reset the rotation angle θ to zero when, for example, the rotation angle θ reaches a predetermined angle. With this configuration, the maximum value of the rotation angle θ calculated by the rotation angle calculator 32 is limited to the predetermined angle. Therefore, this configuration makes it possible to reduce the size of a memory necessary to store the rotation angle θ.

The predetermined angle is, for example, the central angle of an arc formed by the commutator segment 20a, i.e., the inter-slit angle θc. With this configuration, the rotation angle detector 100 can set the inter-slit angle θc as the maximum value of the cumulative error of the rotation angle θ calculated by the rotation angle calculator 32.

The acceptable range is, for example, the range of the maximum error of the rotation angle θ that is generated each time the motor 10 rotates by the inter-slit angle θc. Here, when the rotational angular velocity calculator 31 calculates a rotational angular velocity ω that is greater than the actual rotational angular velocity, the maximum value of the rotation angle θ (including an error), at which the first pulse signal Pa based on the actual rotation angle is generated, is the second threshold θd. Also, when the rotational angular velocity calculator 31 calculates a rotational angular velocity ω that is less than the actual rotational angular velocity, the minimum value of the rotation angle θ (including an error), at which the first pulse signal Pa based on the actual rotation angle is generated, is the first threshold θu. Therefore, in the rotation angle detector 100, errors in the rotation angle θ calculated by the rotation angle calculator 32 are not accumulated. That is, regardless of the number of rotations of the motor 10, the error can be kept within a range between −α and +β.

The second signal generator 35 is configured to generate the second pulse signal Pb if the rotation angle θ is greater than or equal to the first threshold θu when the first pulse signal Pa is received. For example, the first threshold θu is set in advance at a value smaller than the predetermined angle (the inter-slit angle θc). With this configuration, the second signal generator 35 assumes that the first pulse signal Pa generated when the rotation angle θ is greater than or equal to the first threshold θu is not based on noise. Also, the second signal generator 35 generates the second pulse signal Pb when the rotation angle θ reaches the predetermined angle (the inter-slit angle θc) even if the first pulse signal Pa is not generated. This configuration makes it possible to prevent the calculation of rotation information from being influenced by the generation failure of the first pulse signal Pa.

Also, the second signal generator 35 is configured to not generate the second pulse signal Pb if the rotation angle θ is less than the first threshold θu when the first pulse signal Pa is received. With this configuration, the second signal generator 35 can determine that the first pulse signal Pa generated when the rotation angle θ is less than the first threshold θu is based on noise. This makes it possible to prevent generation of a second pulse signal Pb corresponding to a first pulse signal Pa generated based on noise. That is, the above configuration makes it possible to reliably prevent the calculation of rotation information from being influenced by the first pulse signal Pa generated based on noise.

Also, the second signal generator 35 is configured to output, to the rotation angle calculator 32, a command to reset the rotation angle θ to zero if the rotation angle θ is less than the second threshold θd when the first pulse signal Pa is received. For example, the second threshold θd is set in advance at a value whose phase is delayed by β from the predetermined angle (the inter-slit angle θc). With this configuration, the second signal generator 35 assumes that a first pulse signal Pa is not based on noise if the first pulse signal Pa is received immediately after generating the second pulse signal Pb prior to a generation failure of the first pulse signal Pa. This configuration makes it possible to associate the first pulse signal Pa with the second pulse signal Pb generated immediately before the first pulse signal Pa is received. This configuration makes it possible to reliably prevent the calculation of rotation information from being influenced by an error in the generation timing of the first pulse signal Pa.

An aspect of this disclosure makes it possible to more reliably detect failure of a device for obtaining information on the rotation of a direct-current commutator motor.

A motor module, a rotation angle detector, and a method for detecting failure of the rotation angle detector according to embodiments of the present invention are described above. However, the present invention is not limited to the specifically disclosed embodiments, and variations and modifications may be made without departing from the scope of the present invention.

What is claimed is:

1. A rotation angle detector, comprising:
    a rotational angular velocity calculator that calculates a rotational angular velocity of a motor based on an inter-terminal voltage of the motor detected by a voltage detector and a current flowing through the motor and detected by a current detector;
    a ripple detector that detects a ripple component included in the current; and
    a failure detector that detects a failure of any one of the voltage detector, the current detector, and the ripple detector based on an output from the voltage detector, an output from the current detector, and an output from the ripple detector,
    wherein the failure detector determines that the failure has occurred when a state, where the outputs from two of the voltage detector, the current detector, and the ripple detector indicate normal rotation and the output from a remaining one of the voltage detector, the current detector, and the ripple detector does not indicate normal rotation, continues for a predetermined period of time.

2. The rotation angle detector as claimed in claim 1, further comprising:
    a timer that measures a duration of the state where the outputs from the two of the voltage detector, the current detector, and the ripple detector indicate normal rotation and the output from the remaining one of the voltage detector, the current detector, and the ripple detector does not indicate normal rotation,
    wherein the failure detector determines that the failure has occurred when the measured duration exceeds the predetermined period of time.

3. The rotation angle detector as claimed in claim 1, wherein the failure detector determines that the ripple detector is at fault when a state, where the output from the voltage detector indicates normal rotation, the output from the current detector indicates normal rotation, and the output from the ripple detector does not indicate normal rotation, continues for the predetermined period of time.

4. The rotation angle detector as claimed in claim 1, wherein the failure detector determines that the voltage detector is at fault when a state, where the output from the voltage detector does not indicate normal rotation, the output from the current detector indicates normal rotation, and the output from the ripple detector indicates normal rotation, continues for the predetermined period of time.

5. The rotation angle detector as claimed in claim 1, wherein the failure detector determines that the current detector is at fault when a state, where the output from the voltage detector indicates normal rotation, the output from the current detector does not indicate normal rotation, and the output from the ripple detector indicates normal rotation, continues for the predetermined period of time.

6. The rotation angle detector as claimed in claim 1, wherein
    the failure detector includes
        a majority circuit that outputs a result indicating that the outputs from two or more of the voltage detector, the current detector, and the ripple detector match each other,
        a first exclusive-OR circuit that detects a mismatch between the output from the majority circuit and the output from the voltage detector,
        a second exclusive-OR circuit that detects a mismatch between the output from the majority circuit and the output from the current detector,
        a third exclusive-OR circuit that detects a mismatch between the output from the majority circuit and the output from the ripple detector; and
    the failure detector
        determines that the voltage detector is at fault when the output from the majority circuit does not match the output from the voltage detector,
        determines that the current detector is at fault when the output from the majority circuit does not match the output from the current detector, and
        determines that the ripple detector is at fault when the output from the majority circuit does not match the output from the ripple detector.

7. The rotation angle detector as claimed in claim 1, wherein when the failure is detected, the failure detector allows the motor to operate only when the motor is manually controlled.

8. A motor module, comprising:
a motor; and
the rotation angle detector as claimed in claim 1.

9. A rotation angle detector, comprising:
a rotational angular velocity calculator that calculates a rotational angular velocity of a motor based on an inter-terminal voltage of the motor detected by a voltage detector and a current flowing through the motor and detected by a current detector;
a ripple detector that detects a ripple component included in the current; and
a failure detector that detects a failure of any one of the voltage detector, the current detector, and the ripple detector based on an output from the voltage detector, an output from the current detector, and an output from the ripple detector,
wherein the failure detector
detects a normal state when all of the outputs from the voltage detector, the current detector, and the ripple detector indicate or do not indicate normal rotation, or otherwise detects an abnormal state, and
determines that the failure has occurred when the abnormal state continues for a predetermined period of time.

10. The rotation angle detector as claimed in claim 9, wherein
the failure detector determines that one of the voltage detector, the current detector, and the ripple detector is at fault when one of a first state and a second state continues for the predetermined period of time;
in the first state, the outputs from two of the voltage detector, the current detector, and the ripple detector indicate normal rotation and only the output from the one of the voltage detector, the current detector, and the ripple detector does not indicate normal rotation; and
in the second state, the outputs from two of the voltage detector, the current detector, and the ripple detector do not indicate normal rotation and only the output from the one of the voltage detector, the current detector, and the ripple detector indicates normal rotation.

11. A motor module, comprising:
a motor; and
the rotation angle detector as claimed in claim 9.

12. A method performed by a rotation angle detector including
a rotational angular velocity calculator that calculates a rotational angular velocity of a motor based on an inter-terminal voltage of the motor detected by a voltage detector and a current flowing through the motor and detected by a current detector, and
a ripple detector that detects a ripple component included in the current,
the method comprising:
determining that a failure has occurred when a state, where outputs from two of the voltage detector, the current detector, and the ripple detector indicate normal rotation and an output from a remaining one of the voltage detector, the current detector, and the ripple detector does not indicate normal rotation, continues for a predetermined period of time.

* * * * *